United States Patent
La Delfa et al.

(10) Patent No.: US 11,780,176 B2
(45) Date of Patent: Oct. 10, 2023

(54) METHOD FOR PREPARATION OF A MOULDED COMPOSITE FROM A BULK MOULDING COMPOUND

(71) Applicant: Arxada AG, Visp (CH)

(72) Inventors: Gaetano La Delfa, Naters (CH); Stefan Ellinger, Visp (CH); Roger Mazotti, Visp (CH); Marcel Sommer, Grenzach-Wyhlen (DE); Stefano Licari, Busto Arsizio (IT); Sandro Landonio, Busto Arsizio (IT)

(73) Assignee: Arxada AG, Visp (CH)

( * ) Notice: Subject to any disclaimer, the term of this patent is extended or adjusted under 35 U.S.C. 154(b) by 0 days.

(21) Appl. No.: 17/792,312

(22) PCT Filed: Feb. 12, 2021

(86) PCT No.: PCT/EP2021/053559
§ 371 (c)(1),
(2) Date: Jul. 12, 2022

(87) PCT Pub. No.: WO2021/160866
PCT Pub. Date: Aug. 19, 2021

(65) Prior Publication Data
US 2023/0102052 A1   Mar. 30, 2023

(30) Foreign Application Priority Data

Feb. 14, 2020 (EP) ................. 20157481

(51) Int. Cl.
| | | |
|---|---|---|
| *B29C 70/02* | (2006.01) |
| *B29C 45/00* | (2006.01) |
| *B29C 45/56* | (2006.01) |
| *C08G 18/02* | (2006.01) |
| *C08K 7/06* | (2006.01) |
| *C08K 7/14* | (2006.01) |
| *B29K 105/12* | (2006.01) |
| *B29K 307/04* | (2006.01) |
| *B29K 309/08* | (2006.01) |

(52) U.S. Cl.
CPC ........ *B29C 70/025* (2013.01); *B29C 45/0001* (2013.01); *B29C 45/561* (2013.01); *C08G 18/02* (2013.01); *C08K 7/06* (2013.01); *C08K 7/14* (2013.01); *B29K 2105/12* (2013.01); *B29K 2307/04* (2013.01); *B29K 2309/08* (2013.01); *B29K 2849/00* (2013.01)

(58) Field of Classification Search
CPC ............... B29C 70/081; B29C 66/721; B29C 45/14786; B29C 45/0005; B29C 43/006; B29C 64/165; B29C 45/561; B29C 45/0001; B29C 70/025; C08K 7/14; C08K 7/06; C08G 18/02
See application file for complete search history.

(56) References Cited

U.S. PATENT DOCUMENTS

| | | | |
|---|---|---|---|
| 2012/0153532 A1 | 6/2012 | Jennrich et al. | |
| 2016/0304684 A1* | 10/2016 | Ellinger | B29C 70/86 |

FOREIGN PATENT DOCUMENTS

| | | |
|---|---|---|
| CN | 102419096 | 4/2012 |
| CN | 108264763 | 7/2018 |
| EP | 3077449 | 10/2016 |
| JP | H01144426 | 6/1989 |
| JP | 2003253125 | 9/2003 |
| JP | 2005506422 | 3/2005 |

OTHER PUBLICATIONS

International Search Report and Written Opinion for PCT/EP2021/053559 dated May 7, 2021, 13 pages.

* cited by examiner

*Primary Examiner* — Stella K Yi
(74) *Attorney, Agent, or Firm* — Dority & Manning, P.A.

(57) ABSTRACT

A bulk moulding compound comprising one or more cyanate ester, a catalyst, a filler and reinforcement fibres is provide, whereby the one or more cyanate ester is independently selected from a difunctional cyanate ester compound and/or a polyfunctional cyanate ester and mixtures of these cyanate esters. Furthermore, the catalyst is independently selected from the group consisting of 4,4' methylene-bis(2,6-diethylaniline) (M-DEA), 4,4'-methylene-bis(3-chloro-2,6-diethyl-aniline) (M-CDEA), aluminum(III)acetylacetonate, and mixtures thereof.

14 Claims, No Drawings

METHOD FOR PREPARATION OF A MOULDED COMPOSITE FROM A BULK MOULDING COMPOUND

RELATED APPLICATIONS

The present application is the national stage entry of International Patent Application No. PCT/EP2021/053559 having a filing date of Feb. 12, 2021, which claims priority to European Patent Application No. 20 157 481.1 having a filing date of Feb. 14, 2020, which are incorporated herein by reference.

DESCRIPTION

The present invention relates to styrene-free bulk moulding compound (BMCs), methods for preparing such bulk moulded compounds, and moulded composites based on these bulk moulding compounds (BMCs). The bulk moulding compounds according to the invention are made of a resin formulation based on a cyanate ester and reinforcement fibres, a catalyst and a filler.

BACKGROUND OF THE INVENTION

Bulk moulding compound (BMC) materials are generally based on unsaturated polyester resins and vinyl ester resins. BMCs are fabricated into complex parts (moulded composites) through compression moulding, as well as in transfer moulding or injection moulding.

The fields of application of complex moulded composites based on bulk moulding compound (BMC) materials include demanding electrical goods and appliances, automotive, industrial and other transportation applications. Metallic structural components continue to be replaced by reinforced organic polymers (moulded composite materials). The advantages the reinforced organic polymers offer include lighter weight, with high stiffness and high strength, better resistance to corrosion and in some cases a superior strength-to-weight ratio. Further moulded composite materials offer cost savings and fast production times compared to metallic fabrication processes and the ability to produce parts having complex geometries that are difficult to produce with metals.

Unsaturated polyester and vinylester resin systems that are commonly used for bulk moulding compounds are formulated with a monomer possessing a vinyl group like styrene. This monomer participates in the crosslinking reaction. However the thermosetting itself and the monomer pose a potential hazard for the producers of the moulding compounds such as BMCs, SMCs (sheet moulding compounds) or TMCs (thick moulding compounds) as well as for the moulded part producers (moulders). Further, the moulded parts release unreacted styrene and other volatile substances, in particular during post-production steps such as cutting and drilling, thus exposing the end-user to a health risk.

US 2012/008241739B2 discloses sheet moulding compounds (SMC), bulk moulding compounds (BMC) or thick moulding compounds (TMC) comprising thermosetting resins based on renewable resources with the aim to substitute the state of art materials with styrene free materials. The glass transition temperatures of those styrene free thermosetting resins was between 66.7° C. and 130° C. However for many applications and especially for high temperature applications, a glass transition temperature greater than 130° C. is generally regarded as a minimum for many structural and non-structural composites. A glass transition temperature of lower 130° C. limits the applicability of the polymeric composite material.

CN103467982A discloses a cyanate resin raw material composition and cyanate resin and a cyanate resin metal composite material and a preparation method thereof, wherein the cyanate resin raw material is made of cyanate monomer material, short glass fibre in the presence of a catalyst copper(II)acetylacetonate and nonylphenol as a liquid promoter. Nonylphenol has been widely used in the manufacturing of resins, rubbers and plastics. Since nonylphenol is very toxic and due to the effects of nonylphenol on health and environment there is a need to develop a method for the preparation of cyanate resins without the use of such environmental problematic promoters.

With the increasing demand of high performing composite materials in the different fields of applications, there was a need to provide bulk moulding compounds with higher glass transition temperature Tg, higher decomposition temperature, improved flammability, high char yield and higher stiffness properties.

Shelf life of a BMC compound after maturation is a very important property. In practice a BMC need a shelf life of at least 2 to 3 weeks as the material has to be shipped to the customer and it must be possible to store the material at the customer's location for a certain period of time, during which the key properties of the material have to remain essentially the same.

One method that is used for bulk moulding compounds to overcome the issue of resin storage stability BMC formulations is to provide a two-part resin system, where the cyanate ester, the reinforcement fibres and a filler and the catalyst (curing agent) are stored in separate tanks until the point at which they are required to be mixed together. This method has been shown to eliminate reactivity up until the components are mixed together. However, this approach often introduces difficulties relating to the certainty of the ratio of resin to fibre, to filler and to catalyst at a given point in the process and the thoroughness of the mixing process itself. This is also not feasible for many moulders producing the final parts by compression moulding since they neither have the knowledge nor the capability to formulate and prepare the mixture of the different components to produce the BMC compounds.

Such there was a need to provide a resin formulation for a bulk moulding compound made of a resin formulation based on a cyanate ester with extended shelf life while maintaining the desired moulding characteristics and end-use properties. It could be surprisingly found that moulded composites prepared from bulk moulding compound (BMC) based on a cyanate ester resin provide higher glass transition temperature (Tg), higher decomposition temperature, improved flammability, high char yield and higher stiffness properties with respect to the state of art materials. The styrene free bulk moulding compounds of the invention provide moulded composites that are less toxic. Moreover, the bulk moulding compounds of the invention exhibits excellent storage characteristics, i.e., shelf-life, storage life or storage stability.

DETAILED DESCRIPTION OF THE INVENTION

The present invention is directed to a styrene-free bulk moulding compound, and moulded composites based on said bulk moulding compound that exhibit a high glass transition temperature $T_g$, high decomposition temperature, improved flammability and higher stiffness properties, exhibit excellent storage characteristics and that are less toxic than conventional, styrene-based composites.

BMC

The invention provides a bulk moulding compound (BMC) comprising one or more cyanate ester, a catalyst, a filler and reinforcement fibres, wherein the cyanate ester is independently selected from one or more of a) a difunctional cyanate ester compound of formula (I)

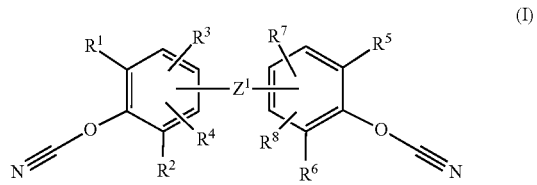

wherein
$R^1$ through $R^8$ are independently selected from the group consisting of hydrogen, linear $C_{1-10}$ alkyl, halogenated linear $C_{1-10}$ alkyl, branched $C_{4-10}$ alkyl, halogenated branched $C_{4-10}$ alkyl, $C_{3-8}$ cycloalkyl, halogenated $C_{3-8}$ cycloalkyl, $C_{1-10}$ alkoxy, halogen, phenyl and phenoxy;
$Z^1$ indicates a direct bond or a divalent moiety independently selected from the group consisting of —O—, —S—, —S(=O)—, —S(=O)$_2$—, —CH$_2$—, —CH(CH$_3$)—, —C(CH$_3$)$_2$—, —CH(CF$_3$)—, —C(CF$_3$)$_2$—, —C(=O)—, —C(=CH$_2$)—, —C(=CCl$_2$)—, —Si(CH$_3$)$_2$—, linear $C_{1-10}$ alkanediyl, branched $C_{4-10}$ alkanediyl, $C_{3-8}$ cycloalkanediyl, 1,2-phenylene, 1,3-phenylene, 1,4-phenylene, —N($R^{13}$)— wherein $R^{13}$ is selected from the group consisting of hydrogen, linear $C_{1-10}$ alkyl, halogenated linear $C_{1-10}$ alkyl, branched $C_{4-10}$ alkyl, halogenated branched $C_{4-10}$ alkyl, $C_{3-8}$ cycloalkyl, phenyl and phenoxy, and moieties of formulas

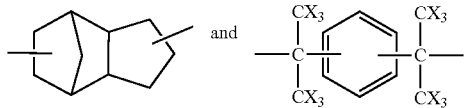

wherein X is independently selected from hydrogen and halogen; and mixtures thereof;
and/or
b) a polyfunctional cyanate ester of formula (II)

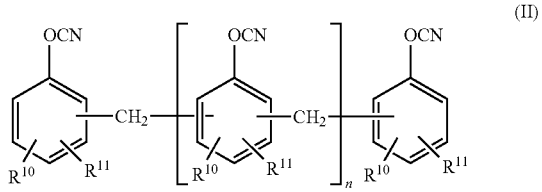

wherein
n is an integer from 1 to 20; and $R^{10}$ and $R^{11}$ are identical or different and independently selected from the group consisting of hydrogen, linear $C_{1-10}$ alkyl, and branched $C_{4-10}$ alkyl;
and oligomers, polymers and mixtures thereof,
and mixtures of cyanate esters of formula (I) and (II).

Here and herein below, the expression "linear $C_{1-10}$ alkyl" includes all alkyl groups having 1 to 10 carbon atoms in an unbranched chain, irrespective of their point of attachment. Examples of $C_{1-10}$ alkyl groups are methyl, ethyl, 1-propyl, 2-propyl (isopropyl), 1-butyl (n-butyl), 2-butyl (sec-butyl), 1-pentyl, 2-pentyl, 3-pentyl, 1-hexyl, 2-hexyl, 3-hexyl and so on. Especially preferred linear $C_{1-10}$ alkyl groups are methyl, ethyl, 1-propyl, 2-propyl (isopropyl) and 1-butyl (n-butyl). Similarly, the expression "branched $C_{4-10}$ alkyl" includes all alkyl groups having 4 to 10 carbon atoms and at least one branching point. Examples of branched $C_{4-10}$ alkyl groups are 2-methyl-1-propyl (isobutyl), 2-methyl-2-propyl (tert-butyl), 3-methyl-1-butyl (isopentyl), 1,1-dimethyl-1-propyl (tert-pentyl), 2,2-dimethyl-1-propyl (neopentyl) and so on. Especially preferred branched $C_{4-10}$ alkyl groups are 2-methyl-1-propyl (isobutyl) and 2-methyl-2-propyl (tert-butyl). The expression "$C_{1-4}$ alkyl" includes methyl, ethyl, 1-propyl, 2-propyl (isopropyl), 1-butyl, 2-butyl (sec-butyl), 2-methylpropyl (isobutyl), and 2-methyl-2-propyl (tert-butyl) while the expressions "$C_{1-4}$ alkoxy" and "$C_{1-4}$ alkylthio" include the before mentioned $C_{1-4}$ alkyl groups bound via an oxygen or divalent sulfur atom. Particularly preferred "$C_{1-4}$ alkoxy" and "$C_{1-4}$ alkylthio" groups are methoxy and methylthio. The expression "$C_{3-8}$ cycloalkyl" includes saturated carbocyclic rings having 3 to 8 carbon atoms, in particular cyclopropyl, cyclobutyl, cyclopentyl, cycloheptyl and cyclooctyl. Especially preferred $C_{3-8}$ cycloalkyls are cyclopentyl, cyclohexyl and cycloheptyl.

The expressions "halogenated $C_{1-10}$ alkyl", "halogenated branched $C_{4-10}$ alkyl" and "halogenated $C_{3-8}$ cycloalkyl" include any of the before mentioned groups bearing one or more halogen atoms selected from fluorine, chlorine, bromine and iodine at any position of the carbon chain or ring. Two or more halogen atoms may be equal or different.

The expression "$C_{1-10}$ alkoxy" includes any of the before mentioned linear $C_{1-10}$ alkyl or branched $C_{4-10}$ alkyl groups bound via an oxygen atom in an ether linkage, such as methoxy, ethoxy, 1-propoxy, 2-propoxy (isopropoxy), 1-butoxy and so on.

As mentioned above, the expression "halogen" includes fluorine, chlorine, bromine and iodine.

The expressions "linear $C_{1-10}$ alkanediyl", "branched $C_{4-10}$ alkanediyl"and" $C_{3-8}$ cycloalkanediyl" include unbranched $C_{1-10}$ alkane chains, branched $C_{4-10}$ alkane chains and saturated carbocyclic rings having 3 to 8 carbon atoms, respectively, according to the above definitions of "linear $C_{1-10}$ alkyl", "branched $C_{4-10}$ alkyl"and" $C_{3-8}$ cycloalkyl", having two open valencies at the same or different carbon atom(s). The term $C_{1-10}$-alkanediyl refers to a bivalent alkylene chain having from 1 to 10 carbon atoms, the term branched $C_{-10}$ alkanediyl refers to a branched bivalent alkylene chain having from 1 to 10 carbon atoms. Examples of linear $C_{1-10}$ alkanediyl groups are methanediyl (methylene), 1,1-ethanediyl (ethylidene), 1,2-ethanediyl (ethylene), 1,3-propanediyl, 1,1-propanediyl (propylidene), 2,2-propanediyl (isopropylidene), 1,4-butanediyl, 1,5-pentanediyl, 1,6-hexanediyl and so on. Examples of branched $C_{4-10}$ alkanediyl groups are 2-methyl-1,1-propanediyl (isobutylidene), 2-methyl-1,3-propanediyl and 2,2-dimethyl-1,3-propanediyl. Examples of $C_{3-8}$ cycloalkanediyl groups are 1,1-cyclopropanediyl, 1,2-cyclopropanediyl, 1,1-cyclobutanediyl, 1,2-cyclobutanediyl, 1,3-cyclobutanediyl, 1,1-cyclopentanediyl, 1,2-cyclopentanediyl, 1,3-cyclopentanediyl, 1,1-cyclohexanediyl, 1,2-cyclohexanediyl, 1,3-cyclohexanediyl and 1,4-cyclohexanediyl. Cycloalkanediyl groups having the open valencies on different carbon atoms may occur in cis and trans isomeric forms.

Shelf life or storage life of all thermoset materials depends on storage temperature. The expression storage stability or shelf life, or storage life as used herein describe the length of time a material will retain its moulding properties when stored at room temperature.

A wide variety of cyanate esters are known to the skilled person including, but not limited to, Novolac cyanate ester (Primaset® PT resins from Lonza), 2,2-bis(4-cyanatophenyl)propane (known as Bisphenol-A dicyanate, available under trade name Primaset® BADCy, AroCy® B-10), bis(4-cyanato-3,5-dimethylpheny)methane (known as Bisphenol-F dicyanate, available under trade name Primaset® METHYLCy, AroCy® M-10), 1,1'-bis(4-cyanatophenyl)ethane (known as Bisphenol-E dicyanate, available under trade name Primaset® LeCy, AroCy® L-10), bis(4-cyanatophenyl)thioether (available under trade name AroCy® T-10), 3-bis(4-cyanatophenyl-1-(1-methylethylidene))benzene (known as Bisphenol-M dicyanate, available under trade name Primaset® LM-500, AroCy® XU366, RTX366), cyanated phenol-dicyclopentadiene adduct (available under trade name Primaset DT-4000, AroCy®XU-71787.02L, XU71787), 1,3-phenylene-dicyanate (known as resorcinol dicyanate, available under trade name REX-370), fused ring cyanate monomers such as naphthalene and anthraquinone, fluoroaliphatic dicyanates, Primaset® ULL-950S, Primaset® HTL-300 and mixtures thereof.

Further cyanate esters to be used according to the invention are a) the reaction product of 2,2-bis(4-cyanatophenyl)propane (known as Bisphenol-A dicyanate, available under trade name Primaset® BADCy, AroCy® B-10) with hydroxyl-terminated polybutadiene (HTPB), which is an oligomer of butadiene terminated at each end with a hydroxyl functional group;

b) a rubber-modified cyanate ester by incorporating a cross-linked styrene-butadiene rubber copolymer and a styrene-acrylonitrile copolymer into a cyanated phenol-dicyclopentadiene adduct (available under trade name Primaset® DT-4000, AroCy®XU-71787.02L, XU71787);

c) a cyanate ester prepolymer obtained by a prepolymerization reaction of Bisphenol-A dicyanate with butanone.

Preferably, the difunctional cyanate ester is independently selected from compounds of formula I

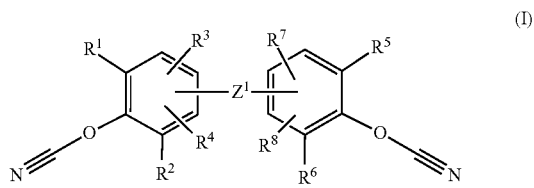

(I)

wherein $R^1$ through $R^8$ are independently selected from the group consisting of hydrogen, linear $C_{1-10}$ alkyl, halogenated linear $C_{1-10}$ alkyl, branched $C_{4-10}$ alkyl, halogenated branched $C_{4-10}$ alkyl, $C_{3-8}$ cycloalkyl, halogenated $C_{3-8}$ cycloalkyl, $C_{1-10}$ alkoxy, halogen, phenyl and phenoxy; and $Z^1$ indicates a direct bond or a divalent moiety independently selected from the group consisting of —O—, —S—, —S(=O)—, —S(=O)$_2$—, —CH$_2$—, —CH(CH$_3$)—, —C(CH$_3$)$_2$—, —CH(CF$_3$)—, —C(CF$_3$)$_2$—, —C(=O)—, —C(=CH$_2$)—, —C(=CCl$_2$)—, —Si(CH$_3$)$_2$—, linear $C_{1-10}$ alkanediyl, branched $C_{4-10}$ alkanediyl, $C_{3-8}$ cycloalkanediyl, 1,2-phenylene, 1,3-phenylene, 1,4-phenylene, —N(R$^{13}$)— wherein R$^{13}$ is selected from the group consisting of hydrogen, linear $C_{1-10}$ alkyl, halogenated linear $C_{1-10}$ alkyl, branched $C_{4-10}$ alkyl, halogenated branched $C_{4-10}$ alkyl, $C_{3-8}$ cycloalkyl, phenyl and phenoxy, and moieties of formulas

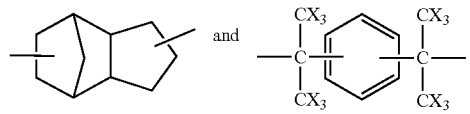

wherein X is independently selected from hydrogen and halogen, and oligomers, polymers or mixtures thereof.

More preferably, $R^1$ through $R^8$ are independently selected from the group consisting of hydrogen and linear $C_{1-10}$ alkyl; and $Z^1$ indicates a direct bond or a divalent moiety independently selected from the group consisting of —S—, —CH$_2$—, —CH(CH$_3$)—, —C(CH$_3$)$_2$—, —C(CF$_3$)$_2$—, —C(=CCl$_2$)—, linear $C_{1-10}$ alkanediyl, $C_{3-8}$ cycloalkanediyl, 1,4-phenylene and moieties of formulas

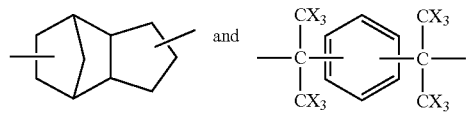

wherein X is independently selected from hydrogen, fluorine, chlorine and bromine;

and oligomers, polymers or mixtures thereof.

Even more preferably, $R^1$, $R^2$, $R^5$ and $R^6$ are independently selected from the group consisting of linear $C_{1-10}$ alkyl, $R^3$, $R^4$, $R^7$ and $R^8$ are hydrogen; and $Z^1$ indicates a direct bond or a divalent moiety independently selected from the group consisting of —S—, —CH$_2$—, —C(CH$_3$)$_2$—, —C(CF$_3$)$_2$—, —C(=CCl$_2$)—, linear $C_{1-10}$ alkanediyl, $C_{3-8}$ cycloalkanediyl, 1,4-phenylene and moieties of formulas

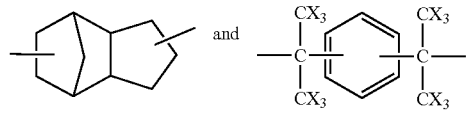

wherein X is independently selected from hydrogen and fluorine, chlorine and bromine, and oligomers, polymers or mixtures thereof.

Even more preferably, $R^1$, $R^2$, $R^5$ and $R^6$ are methyl, $R^3$, $R^4$, $R^7$ and $R^8$ are hydrogen, and $Z^1$ indicates a direct bond or a divalent moiety independently selected from the group consisting of —S—, —CH$_2$—, —C(CH$_3$)$_2$—, —C(CF$_3$)$_2$—, —C(=CCl$_2$)—, and moieties of formulas

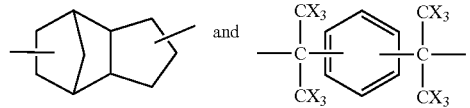

wherein X is hydrogen;
and oligomers, polymers or mixtures thereof.

In one embodiment, the difunctional cyanate ester of formula I is independently selected from the group consisting of
  i) $R^1$, $R^2$, $R^5$ and $R^6$ are methyl, $R^3$, $R^4$, $R^7$ and $R^8$ are hydrogen and wherein $Z^1$ is —$CH_2$— (methylene); and oligomers, polymers or mixtures thereof, or
  ii) $R^1$ through $R^8$ are hydrogen and $Z^1$ is —$C(CH_3)_2$— (Primaset® BADCy); and oligomers, polymers or mixtures thereof, or
  iii) $R^1$ through $R^8$ are hydrogen and $Z^1$ is —S—; and oligomers, polymers or mixtures thereof, or
  iv) $R^1$ through $R^8$ are hydrogen and $Z^1$ is —$C(CF_3)_2$—; and oligomers, polymers or mixtures thereof, or
  v) $R^1$ through $R^8$ are hydrogen and $Z^1$ is —$C(=CCl_2)$—; and oligomers, polymers or mixtures thereof, or
  vi) $R^1$ through $R^8$ are hydrogen and $Z^1$ is independently selected from the group consisting of

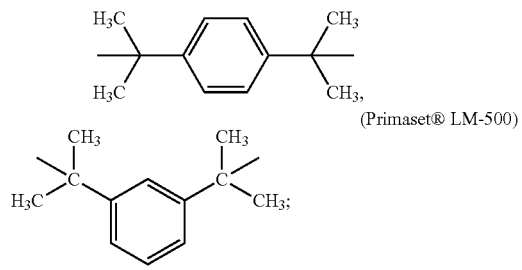
(Primaset® LM-500)

and oligomers, polymers or mixtures thereof, or
  vii) $R^1$ through $R^8$ are hydrogen and $Z^1$ is

(Primaset® DT-4000)

and oligomers, polymers or mixtures thereof.

In another embodiment the difunctional cyanate ester of formula I is independently selected from the group consisting of
  i) $R^1$, $R^2$, $R^5$ and $R^6$ are methyl, $R^3$, $R^4$, $R^7$ and $R^8$ are hydrogen and wherein $Z^1$ is methylene; and oligomers, polymers or mixtures thereof, or
  ii) $R^1$ through $R^8$ are hydrogen and $Z^1$ is —$C(CH_3)_2$— (Primaset® BADCy); and oligomers, polymers or mixtures thereof, or
  iii) $R^1$ through $R^8$ are hydrogen and $Z^1$ is —$C(=CCl_2)$—; and oligomers, polymers or mixtures thereof, or
  iv) $R^1$ through $R^8$ are hydrogen and $Z^1$ is s independently selected from the group consisting of

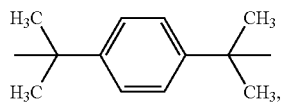

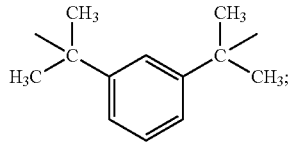
(Primaset® LM-500)

and oligomers, polymers or mixtures thereof, or
  v) $R^1$ through $R^8$ are hydrogen and $Z^1$ is

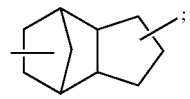
(Primaset® DT-4000)

and oligomers, polymers or mixtures thereof,
and oligomers, polymers or mixtures thereof.

The polyfunctional cyanate ester is independently selected from compounds of formula II

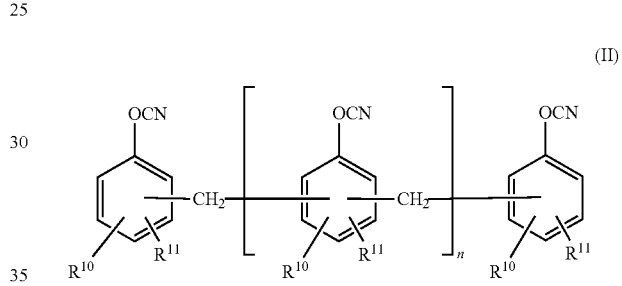
(II)

wherein
n is an integer from 1 to 20; and $R^{10}$ and $R^{11}$ are identical or different and independently from each other selected from the group consisting of hydrogen, linear $C_{1-10}$ alkyl, and branched $C_{4-10}$ alkyl; and oligomers, polymers or mixtures thereof.

The polyfunctional cyanate esters may be oligomeric mixtures of molecules having different values of n. Such oligomeric mixtures are usually characterized by an average value of n which may be a non-integer number. Preferably n is in a range between 1 to 20, more preferably between 1 to 6, more preferably between 2 to 6.

Preferably, the polyfunctional cyanate ester is independently selected from the compounds of formula II wherein n is an integer from 1 to 10 and $R^{10}$ and $R^{11}$ are identical or different and independently from each other selected from the group consisting of hydrogen, linear $C_{1-4}$ alkyl and branched $C_{3-4}$ alkyl.

More preferably, n is an integer from 1 to 6 and $R^{10}$ and $R^{11}$ are identical or different and independently selected from the group consisting of hydrogen, methyl, ethyl, propyl and butyl.

Even more preferably, n is an integer from 2 to 6 and $R^{10}$ and $R^{11}$ are identical or different and independently selected from the group consisting of hydrogen and methyl.

Most preferably, n is an integer from 2 to 6 and $R^{10}$ and $R^{11}$ are hydrogen.

In one embodiment, the polyfunctional cyanate ester of formula II is independently selected from the group consisting of i) $R^{10}$ and $R^{11}$ are hydrogen and n is an integer from 2 to 3 (compound of formula III), or
ii) $R^{10}$ and $R^{11}$ are hydrogen and n is an integer from 3 to 4 (compound of formula IV), or
iii) $R^{10}$ and $R^{11}$ are hydrogen and n is an integer from 3 to 6 (compound of formula V), or
iv) $R^{10}$ is hydrogen and $R^{11}$ is methyl and n is an integer from 3 to 6 (compound of formula VI),
and oligomers, polymers or mixtures thereof.

In another embodiment, the polyfunctional cyanate ester is independently selected from the group consisting of compound of formula III, compound of formula IV, compound of formula V, and oligomers, polymers or mixtures thereof.

In another embodiment, the polyfunctional cyanate ester is independently selected from the group consisting of compound of formula III, compound of formula IV and oligomers, polymers or mixtures thereof.

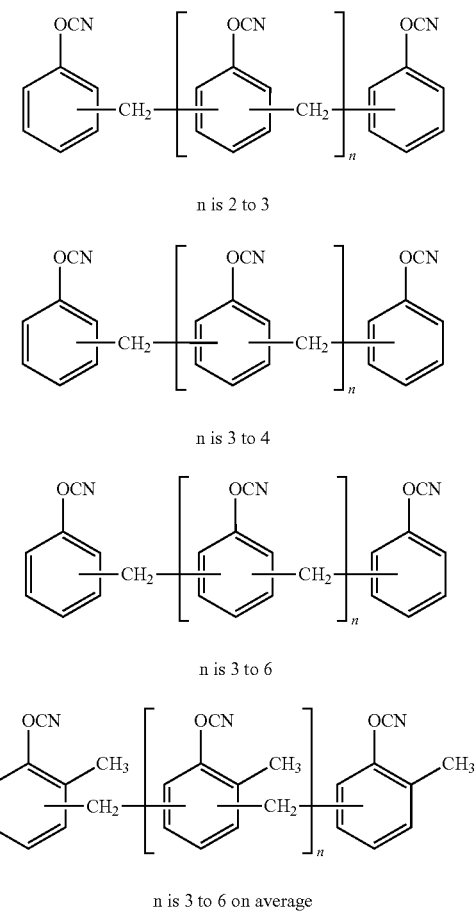

In one embodiment the cyanate ester can be a compound that is liquid or honey-like viscous at temperature around 80° C. In another embodiment the cyanate ester may have a viscosity in a range of 0.4 to 6 Pa*s between 30 to 60° C.

The amount of cyanate ester to be used in accordance with the invention may vary depending on the moulded composite to be formed. The cyanate ester content in the bulk moulding compound is from 20 to 45 wt %, more preferably from 20 to 45 wt %, even more preferably from 20 to 35 wt % based on the total weight of the bulk moulding compound.

The low viscosity at room temperature of the cyanate esters used in the bulk moulding compound of the invention allows an easy incorporation of the different ingredients.

The cyanate ester to be used in the invention can be formulated with at least one compound selected form the group comprising of epoxy resins, bismaleimide compounds, benzoxazines compounds, unsaturated polyester compounds and vinylester compounds.

The cyanate ester can be formulated with at least one di- or polyfunctional epoxy resin selected from the group consisting of bisphenol-A diglycidyl ether resins, bisphenol-F diglycidyl ether resins, N,N,O-triglycidyl-3-aminophenol, N,N,O-triglycidyl-4-aminophenol, N,N,N',N'-tetraglycidyl-4,4'-methylenebisbenzenamine, 4,4',4''-methylidenetrisphenol triglycidyl ether resins, naphthalenediol diglycidyl ethers, and mixtures thereof.

The cyanate ester can be formulated with at least one bismaleimide compounds known to the skilled person and is selected from the group consisting of for examples 2,2'-bis (4-(4-maleimidophenoxy)-phenyl)propane, bis(3-ethyl-5-methyl-4-maleimidophenyl)methane and mixtures thereof as disclosed in WO2018/139368.

The cyanate ester can be formulated with at least one benzoxazines compounds known to the skilled person and is selected from the group consisting of for examples bisphenol-A benzoxazine, bisphenol-F benzoxazine, phenolphthaleine (PhPTH) benzoxazine, dicyclopentadiene (DCPD) benzoxazine, thiodiphenol benzoxazine and mixtures thereof.

The cyanate ester can be formulated with at least one unsaturated polyester compounds known to the skilled person and is selected from the group consisting of for examples isophthalic polyester, acrylic based unsaturated polyester, methyl methacrylate (MMA) based unsaturated polyester, butyl methacrylate (BMA) based unsaturated polyester, acrylonitrile (AN) based unsaturated polyester and mixtures thereof.

The cyanate ester can be formulated with at least one vinylester compounds known to the skilled person and is selected from the group consisting of for examples methacrylate vinylester, acrylate vinylester, bisphenol-A epoxy based vinylester, phenolic novolac based vinylester, tetrabromobisphenol-A epoxy based vinylester and mixtures thereof.

Further, the cyanate esters can be formulated with at least one reactive modifier which include but are not limited to thermoplastics, small organic molecules, rubbers, and inorganic/organometallic polymers. The reactive groups on the additives include but are not limited to hydroxyl groups, acrylate, methacrylate, phenol groups, thiol groups, epoxy groups, bis-malemide groups, benzoxazin group, amines, thiols, thiophenols, and phosphorous groups.

Suitable catalysts to be used in the invention are selected from the group consisting of aliphatic mono-, di- and polyamines, aromatic mono-, di- and polyamines, carbocyclic mono-, di and polyamines, heterocyclic mono-, di- and polyamines, compounds containing a five- or six-membered nitrogen-containing heterocyclic ring, hydroxyamines, phosphines, phenols, and mixtures thereof.

In CN103467982A it is disclosed that copper(II)acetylacetonate in the presence of nonylphenol as liquid promoter is a suitable catalyst for the preparation of cyanate ester resins. Due to the effects on health and the environment of non-ylphenol there was a need to develop a method for the preparation of cyanate resins without the use of environmental problematic promoters. It could be found that by using copper(II)acetylacetonate as catalyst in the presence of a phenol as liquid promoter the copper(II)acetylacetonate is difficult to mix and homogenize with the cyanate esters and leads to a very reactive and highly exothermic reaction mixture. Such a system is unsuitable for the production of a bulk moulding compounds that exhibits excellent storage stability.

Preferably, the catalyst is independently selected from the group consisting of aromatic diamine curing catalysts, transition metal salt catalysts, and mixtures thereof.

The aromatic diamine curing catalyst is selected from the group consisting of aromatic diamines of formula VIIa and VIIb

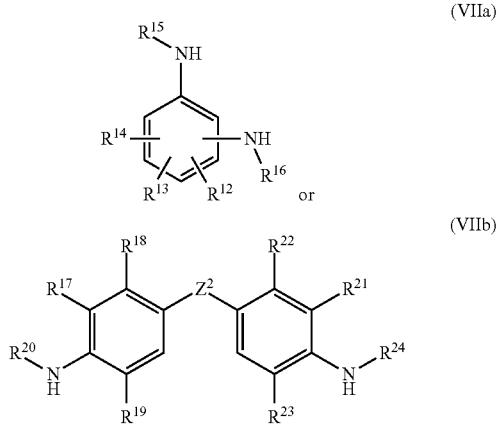

wherein $R^{12}$, $R^{13}$, $R^{14}$, $R^{17}$, $R^{16}$, $R^{18}$, $R^{19}$, $R^{21}$, $R^{22}$ and $R^{23}$ are independently selected from hydrogen, $C_{1-4}$ alkyl, $C_{1-4}$ alkoxy, $C_{1-4}$ alkylthio and chlorine;

$R^{15}$, $R^{16}$, $R^{20}$ and $R^{24}$ are independently selected from hydrogen and $C_{1-8}$ alkyl; and $Z^2$ indicates a direct bond or a divalent moiety independently selected from the group consisting of —O—, —S—, —S(=O)—, —S(=O)$_2$—, —CH$_2$—, —CH(CH$_3$)—, —C(CH$_3$)$_2$—, —CH(CF$_3$)—, —C(CF$_3$)$_2$—, —C(=O)—, —C(=CH$_2$)—, —C(=CCl$_2$)—, —Si(CH$_3$)$_2$—, linear $C_{1-10}$ alkanediyl, branched $C_{4-10}$ alkanediyl, $C_{3-8}$ cycloalkanediyl, 1,2-phenylene, 1,3-phenylene, 1,4-phenylene, —N($R^{25}$)— wherein $R^{25}$ is selected from the group consisting of hydrogen, linear $C_{1-10}$ alkyl, halogenated linear $C_{1-10}$ alkyl, branched $C_{4-10}$ alkyl, halogenated branched $C_{4-10}$ alkyl, $C_{3-8}$ cycloalkyl, phenyl and phenoxy.

The expression "$C_{1-4}$ alkyl" is herein meant to include methyl, ethyl, 1-propyl, 2-propyl (isopropyl), 1-butyl, 2-butyl (sec-butyl), 2-methyl-1-propyl (isobutyl) and 2-methyl-2-propyl (tert-butyl) while the expression "$C_{1-8}$ alkyl" is meant to include the before mentioned and all linear and branched alkyl groups having 5 to 8 carbon atoms according to the definitions given above for linear $C_{1-10}$ alkyl and branched $C_{4-10}$ alkyl.

Preferably, $R^{12}$, $R^{13}$, $R^{14}$, $R^{17}$, $R^{16}$, $R^{18}$, $R^{19}$, $R^{21}$, $R^{22}$ and $R^{23}$ are independently selected from hydrogen, $C_{1-4}$ alkyl, and $C_{1-4}$ alkoxy;

$R^{15}$, $R^{16}$, $R^{20}$ and $R^{24}$ are independently selected from hydrogen and $C_{1-4}$ alkyl; and $Z^2$ is a methylene (—CH$_2$—) group.

More preferably, the aromatic diamine curing catalyst is independently selected from the group consisting of 3,5-diethyltoluene-2,4-diamine, 3,5-diethyltoluene-2,6-diamine, 4,4'-methylene-bis(2,6-diisopropylaniline), 4,4'-methylene-bis(2-isopropyl-6-methylaniline), 4,4'-methylene-bis(2,6-diethylaniline) (M-DEA), 4,4'-methylene-bis(3-chloro-2,6-diethylaniline) (M-CDEA), 4,4'-methylene-bis(2-ethyl-6-methylaniline), 4,4'-methylene-bis(N-sec-butylaniline), dimethylthiotoluenediamine (DMTDA), and mixtures thereof Most preferably, the aromatic diamine curing catalyst is independently selected from the group consisting of 4,4'-methylene-bis(2,6-diethylaniline) (M-DEA), 4,4'-methylene-bis(3-chloro-2,6-diethylaniline) (M-CDEA), and mixtures thereof.

The transition metal salt catalyst is independently selected from the group consisting of aluminum(III) acetylacetonate, manganese(II)acetylacetonate, zinc(II)acetylacetonate, cobalt(II)acetylacetonate, cobalt(III)acetylacetonate, iron (III)acetylacetonate, and mixtures thereof.

More preferably the transition metal salt catalyst is independently selected from the group consisting of aluminum (III)acetylacetonate, manganese(II)acetylacetonate, zinc(II) acetylacetonate, and mixtures thereof.

Most preferably the transition metal salt catalyst is aluminum(III)acetylacetonate.

In a particular embodiment, the catalyst is independently selected from the group consisting of 4,4'-methylene-bis(2, 6-diethylaniline) (M-DEA), 4,4'-methylene-bis(3-chloro-2, 6-diethylaniline) (M-CDEA), aluminum(III)acetylacetonate, and mixtures thereof.

It could be found that the above catalysts act as "latent" curing catalysts when used in in the bulk moulding compound of the invention. This bears the advantage that the bulk moulding compounds of the invention can be stored for at least 2 weeks without the necessity of adding an inhibitor to avoid curing during storage.

In another embodiment the bulk moulding compounds of the invention can be stored for at least 3 weeks without the necessity of adding an inhibitor to avoid curing during storage.

In another embodiment the bulk moulding compounds of the invention can be stored for at least 1 month without the necessity of adding an inhibitor to avoid curing during storage.

In another embodiment the bulk moulding compounds of the invention can be stored for at least 2 month without the necessity of adding an inhibitor to avoid curing during storage.

In another embodiment the bulk moulding compounds of the invention can be stored for at least six months without the necessity of adding an inhibitor to avoid curing during storage.

The use of these catalysts allows to provide compositions suitable for the production of bulk moulding compounds with excellent storage stability. At the same time, the bulk moulding compounds of the invention maintain good mould-flow characteristics and can be cured rapidly at temperatures above 120° C.

Generally, the curing time of a moulding composite according to the invention depends on the amount of catalyst that is present in the bulk moulding compound. Therefore, the amount of the curing catalyst can be varied to adapt to different applications and needs. Typically, the amount of the catalyst ranges from 0.05 to 2.0 wt %, more preferably from 0.1 to 1.5 wt %, even more preferably from 0.15 to 1.25 wt % based on the total amount of bulk moulding compound.

Suitable reinforcement fibres are known to the skilled of the art, and may be selected from materials such as carbon fibres, glass fibres (such as E glass fibres, S glass fibres), aramid fibres (including KEVLAR®), basalt fibres (geotextile fibres), natural fibres (such as flax, hemp, jute or sisal), fleeces and woven fabrics (multi-layered or single layered).

Mixtures of two or more reinforcement fibres can also be applied.

Preferably, the reinforcement fibres are carbon fibres such as polyacrylonitrile (PAN) based carbon fibres, glass fibres, basalt fibres, aramid fibres or natural fibres, or mixtures thereof.

More preferably, the reinforcement fibres are glass fibres or carbon fibres, or mixtures thereof.

The reinforcement fibres may be pre-shaped fibres. The reinforcement fibres may be chopped or continuous, random or oriented, woven or non-woven, knitted or non-knitted or braided according to the requirements of any of various different portions of the desired structure of the moulded composite or fibre reinforced part.

The pre-shaped form of the reinforcement fibres may be selected in view of the desired form of the moulding composite (also called reinforced part), the fibre may have the form of a sheet, mat, bead, strand, thread, band, web, roving, and band of roving, bundle, or the like.

In one embodiment the form of the fibres to be used in the invention are strands.

In another embodiment the form of the fibres to be used in the invention are chopped strands.

In another embodiment, the reinforcement fibres to be used in the invention are independently selected from chopped strand glass fibres, chopped strand carbon fibres, and mixtures thereof.

The amount of reinforcement fibres may vary depending on the desired moulded composite.

The fibre content in the bulk moulding compound is from 10 to 70 wt %, more preferably from 10 to 50 wt %, even more preferably from 12.5 to 35 wt % based on the total weight of the bulk moulding compound.

The bulk moulding composition further comprises a filler. Suitable fillers known to the person skilled in the art are for example organic, such as thermoplastics and elastomers, or inorganic, such as glass microspheres, graphite or silica. Further suitable fillers know to the skilled of the art are for example mineral powders, such as for example $CaCO_3$, coated $CaCO_3$, kaolin clay, $SiO_2$, talc, corundum ($\alpha$-$Al_2O_3$), SiC, glass microspheres, mica, calcium silicate ($Ca_2O_4Si$), MgO, anhydrous calcium sulfate ($CaSO_4$ or anhydrite), ceramic hollow microspheres, fused mullite ($Al_2O_3$—$SiO_2$), boron nitride (BN), vermiculite, wollastonite or basalt. Mixtures of the above fillers can also be used.

In one embodiment, the filler to be used in the invention is independently selected from the group consisting of $CaCO_3$, coated $CaCO_3$, kaolin clay, $SiO_2$, talc, graphite, corundum ($\alpha$-$Al_2O_3$), SiC, glass microspheres, mica, calcium silicate ($Ca_2O_4Si$), wollastonite, MgO, anhydrous calcium sulfate ($CaSO_4$ or anhydrite), ceramic hollow microspheres, fused mullite ($Al_2O_3$—$SiO_2$), boron nitride (BN), vermiculite, basalt, and mixtures thereof.

In another embodiment, the filler is independently selected from the group consisting of $CaCO_3$, coated $CaCO_3$, kaolin clay, $SiO_2$, wollastonite, talc, and mixtures thereof.

In another embodiment, the filler is independently selected from the group consisting of coated $CaCO_3$, talc, and mixtures thereof.

The fillers may be in particle, powder, sphere, chip and/or strand form and have an average particle size from nanoscale to millimeters, preferably the fillers have an average particle size from 0.1 to 1000 μm, more preferably the fillers have an average particle size of from 0.5 to 500 μm.

Fillers can be coated with suitable surface coatings in order to improve the hydrophobicity, deagglomeration and dispersion, and to allow higher filler loadings of the bulk moulding compound.

The amount of fillers may vary and is preferably from 5 to 60 wt %, preferably from 15 to 50 wt %, more preferably from 15 to 45 wt %, based on the total weight of the bulk moulding compound.

The amount of cyanate ester or formulated cyanate ester, reinforcement fibres, catalyst and filler may vary in the bulk moulding compound.

In one embodiment the bulk moulding compound comprises from 20 to 45 wt % of cyanate ester or formulated cyanate ester, from 10 to 70 wt % of fibres such as chopped strand reinforcement fibres, from 0.1 to 2 wt % of catalyst and from 1 to 60 wt % fillers, based on the total weight of the bulk moulding compound.

In another embodiment the bulk moulding compound comprises from 20 to 40 wt % of cyanate ester or formulated cyanate ester, from 10 to 50 wt % of fibres such as chopped strand reinforcement fibres, from 0.15 to 1.5 wt % of catalyst and from 5 to 50 wt % fillers, based on the total weight of the bulk moulding compound.

In another embodiment the bulk moulding compound comprises from 20 to 35 wt % of cyanate ester or formulated cyanate ester, from 12.5 to 35 wt % of chopped strand reinforcement fibres, from 0.15 to 1.0 wt % of catalyst and from 12 to 45 wt % fillers, based on the total weight of BMC.

The cyanate ester or cyanate ester formulation, the reinforcement fibres, the catalysts and the filler form a highly beneficial binder system for the bulk moulding compound and the moulding composite.

The bulk moulding compound can comprise further components such as mould release agents, shrinkage modifiers, pigments or additives.

A mould release agent is a chemical agent used to prevent other materials from bonding to surfaces, and to facilitate releasing the finished moulded composite from the mould. There are two basic types of mould release agent, internal and external. Examples of suitable internal mould release agents incorporated directly into the bulk moulding compound are for example Chemlease® IC25 and Technik Products Tech Lube 744. Further the internal release are for example a blend of polymeric compounds, fatty acids and glycerine or other proprietary mixtures from suppliers.

External mould release agents are applied onto the bulk moulding compound. A wide variety of external mould release agents are known to the skilled person such as for example Chemlease® R&B EZ, Chemlease® 2726W, Chemlease® 2752W, Chemtrend Zyvax® Flex-Z™ 3.0, Chemtrend Zyvax® Flex-Z™ 6.0, which are applying by spraying on the surface of the bulk moulding compound. To prepare the mould a primer such as for example Chemlease® MPP 712 EZ can be applied on the surfaces. Further the external mould release agents can be based on low boiling point modified naphtha, C7-C9 hydrocarbons, isoalkanes and mixtures and semi-permanent release agents that are based on siloxane and/or fluoro polymers.

In one embodiment, the bulk moulding compound comprises a mould release agent in an amount from 0.1 to 2 wt %, preferably from 0.25 to 1.5 wt %, more preferably from 0.5 to 1.2 wt % based on the total amount of the bulk moulding compound.

A wide variety of shrinkage modifiers are known to the person skilled in the art. Suitable shrinkage modifies to be used in the invention can be selected from thermoplastic materials such as low-density polyethylene (LDPE) and high-density polyethylene (HDPE) and mixtures thereof where high temperature resistance is required.

Shrinkage modifiers to be used in the invention are selected from Coathylene HA 1682 (LDPE) and Coathylene HA 2455 (LDPE).

In one embodiment, the bulk moulding compound comprises from 0.5 to 4 wt %, preferably from 1.0 to 3.5 wt %, more preferably from 1.0 to 2.5 wt %, of shrinkage modifiers, based on the total weight of the bulk moulding compound.

A wide variety of pigments are known to the skilled person which can be used in the invention, such as for example zinc sulphide (ZnS), carbon black and mixtures thereof.

In one embodiment, the bulk moulding compound comprises from 0.5 to 10 wt %, preferably from 0.5 to 7.5 wt %, more preferably from 0.5 to 3 wt % of pigments based on the total weight of the bulk moulding compound.

A wide variety of additives are known to the skilled person which can be used in the invention, such as for example graphene oxide, polyhedral oligomeric silsesquioxanes (POSS), alumina trihydrate (ATH), nanocomposite clays, antimony trioxide, zinc borate and mixtures thereof.

In one embodiment the bulk moulding compound of the invention comprises one or more cyanate ester, a catalyst, a filler and reinforcement fibres, wherein said one or more cyanate ester is independently selected from a difunctional cyanate, ester polyfunctional cyanate ester, and mixtures thereof, wherein said difunctional cyanate ester is a difunctional cyanate ester of formula I independently selected from the group consisting of i) $R^1$, $R^2$, $R^5$ and $R^6$ are methyl, $R^3$, $R^4$, $R^7$ and $R^8$ are hydrogen and wherein $Z^1$ is methylene; and oligomers, polymers or mixtures thereof, or ii) $R^1$ through $R^8$ are hydrogen and $Z^1$ is —C(CH$_3$)$_2$— (Primaset® BADCy); and oligomers, polymers or mixtures thereof, or iii) $R^1$ through $R^8$ are hydrogen and $Z^1$ is —S—; and oligomers, polymers or mixtures thereof, or iv) $R^1$ through $R^8$ are hydrogen and $Z^1$ is —C(CF$_3$)$_2$—; and oligomers, polymers or mixtures thereof, or v) $R^1$ through $R^8$ are hydrogen and $Z^1$ is —C(=CCl$_2$)—; and oligomers, polymers or mixtures thereof, or vi) $R^1$ through $R^8$ are hydrogen and $Z^1$ is independently selected from the group consisting of

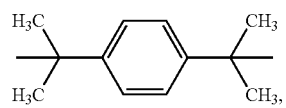
(Primaset® LM-500)

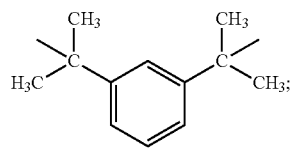

and oligomers, polymers or mixtures thereof, or vii) $R^1$ through $R^8$ are hydrogen and $Z^1$ is

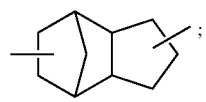
(Primaset® DT-4000)

and oligomers, polymers or mixtures thereof,
and oligomers, polymers or mixtures thereof, wherein said polyfunctional cyanate ester is independently selected from the group consisting of compound of formula III, compound of formula IV, compound of formula V, compound of formula VI and oligomers, polymers or mixtures thereof;

wherein said catalyst is independently selected from the group consisting of aromatic diamine curing catalysts, transition metal salt catalysts, and mixtures thereof;

wherein said filler is independently selected from the group consisting of CaCO$_3$, coated CaCO$_3$, kaolin clay, SiO$_2$, Talc, and mixtures thereof; and wherein said fibre is independently selected from glass fibres, carbon fibres, and mixtures thereof.

In one embodiment the bulk moulding compound of the invention comprises one or more cyanate ester, a catalyst, a filler and reinforcement fibres, wherein said one or more cyanate ester is independently selected from a difunctional cyanate ester, polyfunctional cyanate ester, and mixtures thereof, wherein said difunctional cyanate ester is a difunctional cyanate ester of formula I independently selected from the group consisting of i) $R^1$, $R^2$, $R^5$ and $R^6$ are methyl, $R^3$, $R^4$, $R^7$ and $R^8$ are hydrogen and wherein $Z^1$ is methylene; and oligomers, polymers or mixtures thereof, or ii) $R^1$ through $R^8$ are hydrogen and $Z^1$ is —C(CH$_3$)$_2$— (Primaset® BADCy); and oligomers, polymers or mixtures thereof, or iii) $R^1$ through $R^8$ are hydrogen and $Z^1$ is —S—; and oligomers, polymers or mixtures thereof, or iv) $R^1$ through $R^8$ are hydrogen and $Z^1$ is —C(CF$_3$)$_2$—; and oligomers, polymers or mixtures thereof, or v) $R^1$ through $R^8$ are hydrogen and $Z^1$ is —C(=CCl$_2$)—; and oligomers, polymers or mixtures thereof, or vi) $R^1$ through $R^8$ are hydrogen and $Z^1$ is independently selected from the group consisting of

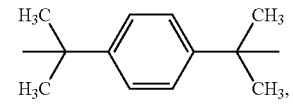
(Primaset® LM-500)

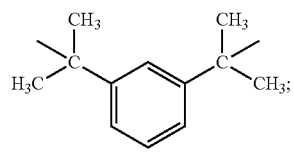

and oligomers, polymers or mixtures thereof, vii) $R^1$ through $R^8$ are hydrogen and $Z^1$

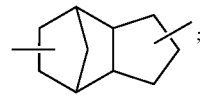
(Primaset® DT-4000)

and oligomers, polymers or mixtures thereof,
and oligomers, polymers or mixtures thereof;

wherein said polyfunctional cyanate ester is independently selected from the group consisting of compound of formula III, compound of formula IV, compound of formula V, compound of formula VI and oligomers, polymers or mixtures thereof;

wherein said catalyst is independently selected from the group consisting of aromatic diamine curing catalysts, transition metal salt catalysts, and mixtures thereof;

wherein said filler is independently selected from the group consisting of $CaCO_3$, coated $CaCO_3$, kaolin clay, $SiO_2$, Talc, and mixtures thereof;

wherein said fibre is independently selected from glass fibres, carbon fibres, and mixtures thereof; and wherein the bulk moulding compound comprises from 20 to 45 wt % of cyanate ester, from 0.1 to 2 wt % of catalyst, from 1 to 60 wt % of filler and from 10 to 70 wt % of fibres, based on the total weight of the bulk moulding compound.

In one embodiment the bulk moulding compound of the invention comprises one or more cyanate ester, a catalyst, a filler and reinforcement fibres, wherein said one or more cyanate ester is independently selected from a difunctional cyanate ester, polyfunctional cyanate ester, and mixtures thereof, wherein said difunctional cyanate ester is a difunctional cyanate ester of formula I independently selected from the group consisting of
  i) $R^1$, $R^2$, $R^5$ and $R^6$ are methyl, $R^3$, $R^4$, $R^7$ and $R^8$ are hydrogen and wherein $Z^1$ is methylene; and oligomers, polymers or mixtures thereof, or
  ii) $R^1$ through $R^8$ are hydrogen and $Z^1$ is —$C(CH_3)_2$— (Primaset® BADCy); and
  oligomers, polymers or mixtures thereof, or
  iii) $R^1$ through $R^8$ are hydrogen and $Z^1$ is —$C(=CCl_2)$; and oligomers, polymers or mixtures thereof, or
  iv) $R^1$ through $R^8$ are hydrogen and $Z^1$ is independently selected from the group consisting of

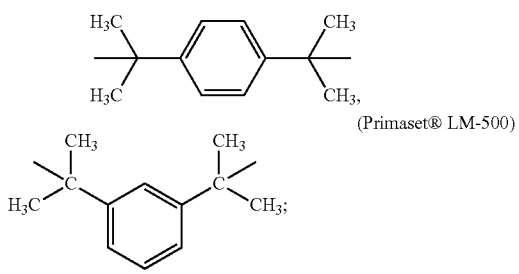
(Primaset® LM-500)

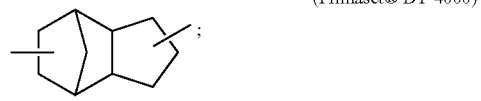

and oligomers, polymers or mixtures thereof, or
  v) $R^1$ through $R^8$ are hydrogen and $Z^1$ is

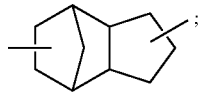
(Primaset® DT-4000)

and oligomers, polymers or mixtures thereof,
  and oligomers, polymers or mixtures thereof,
wherein said polyfunctional cyanate ester independently selected from the group consisting of compound of formula III, compound of formula IV, compound of formula V and oligomers, polymers or mixtures thereof;

wherein said catalyst is independently selected from the group consisting of 4,4'-methylene-bis(2,6-diethylaniline) (M-DEA), 4,4'-methylene-bis(3-chloro-2,6-diethylaniline) (M-CDEA) aluminum(III)acetylacetonate, and mixtures thereof:

wherein said filler is independently selected from the group consisting of $CaCO_3$, coated $CaCO_3$, Talc, and mixtures thereof; and wherein said fibre is independently selected from chopped strand glass fibres and chopped strand carbon fibres; and mixtures thereof.

In one embodiment the bulk moulding compound of the invention comprises one or more cyanate ester, a catalyst, a filler and reinforcement fibres, wherein said one or more cyanate ester is independently selected from a difunctional cyanate, ester polyfunctional cyanate ester, and mixtures thereof, wherein said difunctional cyanate ester is a difunctional cyanate ester of formula I independently selected from the group consisting of
  i) $R^1$, $R^2$, $R^5$ and $R^6$ are methyl, $R^3$, $R^4$, $R^7$ and $R^8$ are hydrogen and wherein $Z^1$ is methylene; and oligomers, polymers or mixtures thereof, or
  ii) $R^1$ through $R^8$ are hydrogen and $Z^1$ is —$C(CH_3)_2$— (Primaset® BADCy); and
  oligomers, polymers or mixtures thereof, or
  iii) $R^1$ through $R^8$ are hydrogen and $Z^1$ is —$C(=CCl_2)$—; and oligomers, polymers or mixtures thereof, or
  iv) $R^1$ through $R^8$ are hydrogen and $Z^1$ is independently selected from the group consisting of

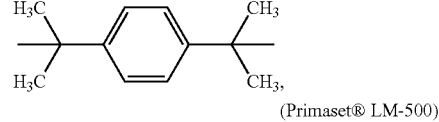
(Primaset® LM-500)

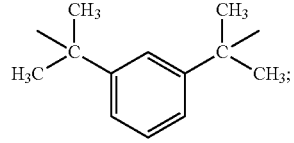

and oligomers, polymers or mixtures thereof, or
  v) $R^1$ through $R^8$ are hydrogen and $Z^1$ is (Primaset® DT-4000)

and oligomers, polymers or mixtures thereof,
  and oligomers, polymers or mixtures thereof,
wherein said polyfunctional cyanate ester is independently selected from the group consisting of compound of formula III, compound of formula IV, compound of formula V and oligomers, polymers or mixtures thereof;

wherein said catalyst is independently selected from the group consisting of 4,4'-methylene-bis(2,6-diethylaniline) (M-DEA), 4,4'-methylene-bis(3-chloro-2,6-diethylaniline) (M-CDEA) aluminum(III)acetylacetonate, and mixtures thereof;

wherein said filler is independently selected from the group consisting of CaCO$_3$, coated CaCO$_3$, Talc, and mixtures thereof;

wherein said fibre is independently selected from chopped strand glass fibres and chopped strand carbon fibres; and mixtures thereof; and wherein the bulk moulding compound comprises from 20 to 45 wt % of cyanate ester, from 0.1 to 2 wt % of catalyst, from 1 to 60 wt % of filler and from 10 to 70 wt % of fibres, based on the total weight of the bulk moulding compound.

In one embodiment the bulk moulding compound of the invention comprises one or more cyanate ester, a catalyst, a filler and reinforcement fibres, wherein said one or more cyanate ester is independently selected from a difunctional cyanate ester polyfunctional cyanate ester, and mixtures thereof, wherein said difunctional cyanate ester is a difunctional cyanate ester of formula I independently selected from the group consisting of i) R$^1$, R$^2$, R$^5$ and R$^6$ are methyl, R$^3$, R$^4$, R$^7$ and R$^8$ are hydrogen and wherein Z$^1$ is methylene; and oligomers, polymers or mixtures thereof, or ii) R$^1$ through R$^8$ are hydrogen and Z$^1$ is —C(CH$_3$)$_2$— (Primaset® BADCy); and oligomers, polymers or mixtures thereof, or iii) R$^1$ through R$^8$ are hydrogen and Z$^1$ is —C(=CCl$_2$)—; and oligomers, polymers or mixtures thereof, or iv) R$^1$ through R$^8$ are hydrogen and Z$^1$ is independently selected from the group consisting of

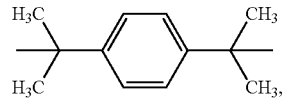

(Primaset® LM-500)

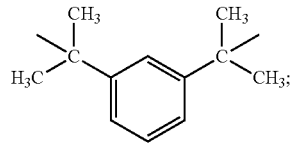

and oligomers, polymers or mixtures thereof, or
v) R$^1$ through R$^8$ are hydrogen and Z$^1$ is
vi)

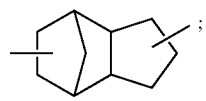

(Primaset® DT-4000)

and oligomers, polymers or mixtures thereof,
and oligomers, polymers or mixtures thereof, wherein said polyfunctional cyanate ester independently selected from the group consisting of compound of formula III, compound of formula IV, compound of formula V and oligomers, polymers or mixtures thereof;

wherein said catalyst is independently selected from the group consisting of 4,4'-methylene-bis(2,6-diethylaniline) (M-DEA), 4,4'-methylene-bis(3-chloro-2,6-diethylaniline) (M-CDEA) aluminum(III) acetylacetonate, and mixtures thereof;

wherein said filler is independently selected from the group consisting of CaCO$_3$, coated CaCO$_3$, Talc, and mixtures thereof; and wherein said fibre is chopped strand glass fibres.

In one embodiment the bulk moulding compound of the invention comprises one or more cyanate ester, a catalyst, a filler and reinforcement fibres, wherein said one or more cyanate ester is independently selected from a difunctional cyanate ester polyfunctional cyanate ester, and mixtures thereof, wherein said difunctional cyanate ester is a difunctional cyanate ester of formula I independently selected from the group consisting of i) R$^1$, R$^2$, R$^5$ and R$^6$ are methyl, R$^3$, R$^4$, R$^7$ and R$^8$ are hydrogen and wherein Z$^1$ is methylene; and oligomers, polymers or mixtures thereof, or ii) R$^1$ through R$^8$ are hydrogen and Z$^1$ is —C(CH$_3$)$_2$— (Primaset® BADCy); and oligomers, polymers or mixtures thereof, or iii) R$^1$ through R$^8$ are hydrogen and Z$^1$ is —C(=CCl$_2$)—; and oligomers, polymers or mixtures thereof, or iv) R$^1$ through R$^8$ are hydrogen and Z$^1$ is independently selected from the group consisting of

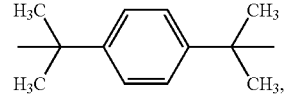

(Primaset® LM-500)

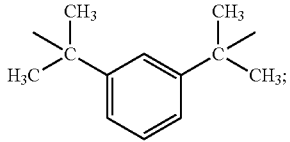

and oligomers, polymers or mixtures thereof, or
v) R$^1$ through R$^8$ are hydrogen and Z$^1$

(Primaset® DT-4000)

and oligomers, polymers or mixtures thereof,
and oligomers, polymers or mixtures thereof, wherein said polyfunctional cyanate ester independently selected from the group consisting of compound of formula III, compound of formula IV, compound of formula V and oligomers, polymers or mixtures thereof;

wherein said catalyst is independently selected from the group consisting of 4,4'-methylene-bis(2,6-diethylaniline) (M-DEA), 4,4'-methylene-bis(3-chloro-2,6-diethylaniline) (M-CDEA) aluminum(III)acetylacetonate, and mixtures thereof;

wherein said filler is independently selected from the group consisting of CaCO$_3$, coated CaCO$_3$, Talc, and mixtures thereof;

wherein said fibre is chopped strand glass fibres; and wherein the bulk moulding compound comprises from 20 to 45 wt % of cyanate ester, from 0.1 to 2 wt % of catalyst, from 1 to 60 wt % fillers and from 10 to 70 wt % of fibres, based on the total weight of the bulk moulding compound.

In one embodiment the bulk moulding compound of the invention comprises one or more cyanate ester, a catalyst, a filler and reinforcement fibres, wherein said one or more cyanate ester is independently selected from the group consisting of compound of formula III, compound of formula IV and oligomers, polymers or mixtures thereof;

said catalyst is independently selected from the group consisting of 4,4'-methylene-bis(2,6-diethylaniline) (M-DEA), 4,4'-methylene-bis(3-chloro-2,6-diethylaniline) (M-CDEA) aluminum(III) acetylacetonate, and mixtures thereof;

said filler is independently selected from the group consisting of $CaCO_3$, coated $CaCO_3$, Talc, and mixtures thereof; and said fibre is chopped strand glass fibres.

In one embodiment the bulk moulding compound of the invention comprises one or more cyanate ester, a catalyst, a filler and reinforcement fibres, wherein said one or more cyanate ester is independently selected from the group consisting of compound of formula III, compound of formula IV and oligomers, polymers or mixtures thereof;

said catalyst is independently selected from the group consisting of 4,4'-methylene-bis(2,6-diethylaniline) (M-DEA), 4,4'-methylene-bis(3-chloro-2,6-diethylaniline) (M-CDEA) aluminum(III) acetylacetonate, and mixtures thereof;

said filler is independently selected from the group consisting of $CaCO_3$, coated $CaCO_3$, Talc, and mixtures thereof, said fibre is chopped strand glass fibres;

and said bulk moulding compounds can be stored for at least 3 weeks without the necessity of adding an inhibitor to avoid curing during storage.

In one embodiment the bulk moulding compound of the invention comprises one or more cyanate ester, a catalyst, a filler and reinforcement fibres, wherein said one or more cyanate ester is independently selected from the group consisting of compound of formula III, compound of formula IV and oligomers, polymers or mixtures thereof;

said catalyst is aluminum(III)acetylacetonate;

said filler is independently selected from the group consisting of $CaCO_3$, coated $CaCO_3$, Talc, and mixtures thereof;

said fibre is chopped strand glass fibres;

and said bulk moulding compounds can be stored for at least 6 month without the necessity of adding an inhibitor to avoid curing during storage.

In one embodiment the bulk moulding compound of the invention comprises one or more cyanate ester, a catalyst, a filler and reinforcement fibres, wherein said one or more cyanate ester is independently selected from group consisting of compound of formula III, compound of formula IV and oligomers, polymers or mixtures thereof;

said catalyst is independently selected from the group consisting of 4,4'-methylene-bis(2,6-diethylaniline) (M-DEA), 4,4'-methylene-bis(3-chloro-2,6-diethylaniline) (M-CDEA) aluminum(III)acetylacetonate, and mixtures thereof;

said filler is independently selected from the group consisting of $CaCO_3$, coated $CaCO_3$, Talc, and mixtures thereof;

said fibre is chopped strand glass fibres; and wherein the bulk moulding compound comprises from 20 to 45 wt % of cyanate ester, from 0.1 to 2 wt % of catalyst, from 1 to 60 wt % of filler and from 10 to 70 wt % of fibre, based on the total weight of the bulk moulding compound.

In one embodiment the bulk moulding compound of the invention comprises one or more cyanate ester, a catalyst, a filler and reinforcement fibres, wherein said one or more cyanate ester is independently selected from the group consisting of compound of formula III, compound of formula IV and oligomers, polymers or mixtures thereof;

said catalyst is independently selected from the group consisting of 4,4'-methylene-bis(2,6-diethylaniline) (M-DEA), 4,4'-methylene-bis(3-chloro-2,6-diethylaniline) (M-CDEA) aluminum(III)acetylacetonate, and mixtures thereof;

said filler is independently selected from the group consisting of $CaCO_3$, coated $CaCO_3$, Talc, and mixtures thereof;

said fibre is chopped strand glass fibres;

wherein the bulk moulding compound comprises from 20 to 45 wt % of cyanate ester, from 0.1 to 2 wt % of catalyst, from 1 to 60 wt % of filler and from 10 to 70 wt % of fibre, based on the total weight of the bulk moulding compound; and said bulk moulding compounds can be stored for at least 3 weeks without the necessity of adding an inhibitor to avoid curing during storage.

In one embodiment the bulk moulding compound of the invention comprises one or more cyanate ester, a catalyst, a filler and reinforcement fibres, wherein said one or more cyanate ester is independently selected from the group consisting of compound of formula III, compound of formula IV and oligomers, polymers or mixtures thereof;

said catalyst is aluminum(III)acetylacetonate;

said filler is independently selected from the group consisting of $CaCO_3$, coated $CaCO_3$, Talc, and mixtures thereof;

said fibre is chopped strand glass fibres;

wherein the bulk moulding compound comprises from 20 to 45 wt % of cyanate ester, from 0.1 to 2 wt % of catalyst, from 1 to 60 wt % of filler and from 10 to 70 wt % of fibre, based on the total weight of the bulk moulding compound; and said bulk moulding compounds can be stored for at least 6 month without the necessity of adding an inhibitor to avoid curing during storage.

In one embodiment the bulk moulding compound of the invention comprises one or more cyanate ester, a catalyst, a filler and reinforcement fibres, wherein said cyanate ester is a difunctional cyanate ester of formula I independently selected from the group consisting of i) $R^1$, $R^2$, $R^5$ and $R^6$ are methyl, $R^3$, $R^4$, $R^7$ and $R^8$ are hydrogen and wherein $Z^1$ is methylene; and oligomers, polymers or mixtures thereof, or ii) $R^1$ through $R^8$ are hydrogen and $Z^1$ is —$C(CH_3)_2$— (Primaset® BADCy); and oligomers, polymers or mixtures thereof, or iii) $R^1$ through $R^8$ are hydrogen and $Z^1$ is —$C(=CCl_2)$—; and oligomers, polymers or mixtures thereof, or iv) $R^1$ through $R^8$ are hydrogen and $Z^1$ is independently selected from the group consisting of

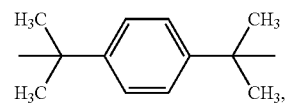

-continued

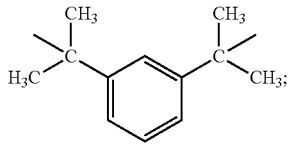
(Primaset® LM-500)

and oligomers, polymers or mixtures thereof, or v) $R^1$ through $R^8$ are hydrogen and $Z^1$ is

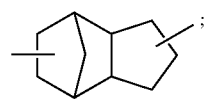
(Primaset® DT-4000)

and oligomers, polymers or mixtures thereof, and oligomers, polymers or mixtures thereof, said catalyst is independently selected from the group consisting of 4,4'-methylene-bis(2,6-diethylaniline) (M-DEA), 4,4'-methylene-bis(3-chloro-2,6-diethylaniline) (M-CDEA) aluminum(III)acetylacetonate, and mixtures thereof;

said filler is independently selected from the group consisting of $CaCO_3$, coated $CaCO_3$, Talc, and mixtures thereof; and said fibre is chopped strand glass fibres, chopped strand carbon fibres, and mixtures thereof.

In one embodiment the bulk moulding compound of the invention comprises one or more cyanate ester, a catalyst, a filler and reinforcement fibres, wherein said cyanate ester is a difunctional cyanate ester of formula I independently selected from the group consisting of i) $R^1$, $R^2$, $R^5$ and $R^6$ are methyl, $R^3$, $R^4$, $R^7$ and $R^8$ are hydrogen and wherein $Z^1$ is methylene; and oligomers, polymers or mixtures thereof, or ii) $R^1$ through $R^8$ are hydrogen and $Z^1$ is —C(CH$_3$)$_2$— (Primaset® BADCy); and oligomers, polymers or mixtures thereof, or iii) $R^1$ through $R^8$ are hydrogen and $Z^1$ is —C(=CCl$_2$)—; and oligomers, polymers or mixtures thereof, or iv) $R^1$ through $R^8$ are hydrogen and $Z^1$ is independently selected from the group consisting of

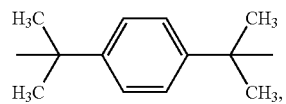

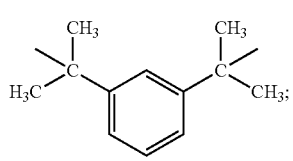
(Primaset® LM-500)

and oligomers, polymers or mixtures thereof, or v) $R^1$ through $R^8$ are hydrogen and $Z^1$ is

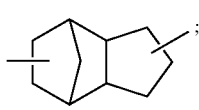
(Primaset® DT-4000)

and oligomers, polymers or mixtures thereof,
and oligomers, polymers or mixtures thereof, wherein said catalyst is independently selected from the group consisting of 4,4'-methylene-bis(2,6-diethylaniline) (M-DEA), 4,4'-methylene-bis(3-chloro-2,6-diethylaniline) (M-CDEA) aluminum(III) acetylacetonate, and mixtures thereof;

wherein said filler is independently selected from the group consisting of $CaCO_3$, coated $CaCO_3$, Talc, and mixtures thereof;

wherein said fibre is chopped strand glass fibres, chopped strand carbon fibres, and mixtures thereof, and wherein the bulk moulding compound comprises from 20 to 45 wt % of cyanate ester, from 0.1 to 2 wt % of catalyst, from 1 to 60 wt % of filler and from 10 to 70 wt % of fibres, based on the total weight of the bulk moulding compound.

In one embodiment the bulk moulding compound of the invention comprises one or more cyanate ester independently selected from a difunctional cyanate ester and polyfunctional cyanate ester and mixtures thereof, wherein said difunctional cyanate ester is a difunctional cyanate ester of formula I independently selected from the group consisting of i) $R^1$, $R^2$, $R^5$ and $R^6$ are methyl, $R^3$, $R^4$, $R^7$ and $R^8$ are hydrogen and wherein $Z^1$ is methylene; and oligomers, polymers or mixtures thereof, or ii) $R^1$ through $R^8$ are hydrogen and $Z^1$ is —C(CH$_3$)$_2$— (Primaset® BADCy); and oligomers, polymers or mixtures thereof, or iii) $R^1$ through $R^8$ are hydrogen and $Z^1$ is —C(=CCl$_2$)—; and oligomers, polymers or mixtures thereof, or iv) $R^1$ through $R^8$ are hydrogen and $Z^1$ is $Z^1$ is independently selected from the group consisting of a.

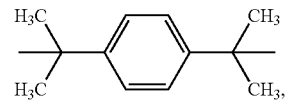

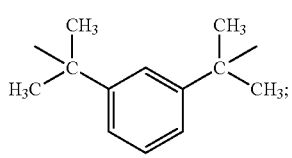
(Primaset® LM-500)

and oligomers, polymers or mixtures thereof, or v) $R^1$ through $R^8$ are hydrogen and $Z^1$

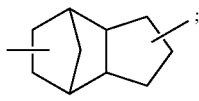
(Primaset® DT-4000)

and oligomers, polymers or mixtures thereof,
and oligomers, polymers or mixtures thereof, wherein said polyfunctional cyanate ester is independently selected from the group consisting of compound of formula III, compound of formula IV, compound of formula V and oligomers, polymers or mixtures thereof, wherein said catalyst is independently selected from the group consisting of 4,4'-methylene-bis(2,6-diethylaniline) (M-DEA), 4,4'-methylene-bis(3-chloro-2,6-diethylaniline) (M-CDEA) and aluminum(III)acetylacetonate and mixtures thereof;

wherein said filler is independently selected from the group consisting of $CaCO_3$, coated $CaCO_3$, Talc and mixtures thereof, and wherein said fibre is chopped strand carbon fibre.

In one embodiment the bulk moulding compound of the invention comprises one or more cyanate ester independently selected from a difunctional cyanate ester and polyfunctional cyanate ester and mixtures thereof, wherein said difunctional cyanate ester is a difunctional cyanate ester of formula I independently selected from the group consisting of
  i) $R^1$, $R^2$, $R^5$ and $R^6$ are methyl, $R^3$, $R^4$, $R^7$ and $R^8$ are hydrogen and wherein $Z^1$ is methylene; and oligomers, polymers or mixtures thereof, or
  ii) $R^1$ through $R^8$ are hydrogen and $Z^1$ is —$C(CH_3)_2$— (Primaset® BADCy); and oligomers, polymers or mixtures thereof, or
  iii) $R^1$ through $R^8$ are hydrogen and $Z^1$ is —$C(=CCl_2)$—; and oligomers, polymers or mixtures thereof, or
  iv) $R^1$ through $R^8$ are hydrogen and $Z^1$ is

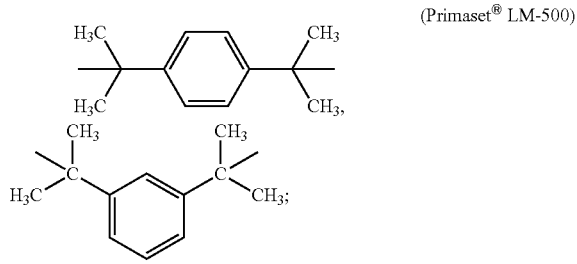

(Primaset® LM-500)

and oligomers, polymers or mixtures thereof, or
  v) $R^1$ through $R^8$ are hydrogen and $Z^1$ is

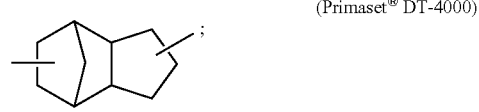

(Primaset® DT-4000)

and oligomers, polymers or mixtures thereof, and oligomers, polymers or mixtures thereof, wherein said polyfunctional cyanate ester is independently selected from the group consisting of compound of formula III, compound of formula IV, compound of formula V and oligomers, polymers or mixtures thereof;

wherein said catalyst is independently selected from the group consisting of 4,4'-methylene-bis(2,6-diethylaniline) (M-DEA), 4,4'-methylene-bis(3-chloro-2,6-diethylaniline) (M-CDEA) and aluminum(III)acetylacetonate and mixtures thereof;

wherein said filler is independently selected from the group consisting of $CaCO_3$, coated $CaCO_3$, Talc and mixtures thereof;

wherein said fibre is chopped strand carbon fibre, and wherein the bulk moulding compound comprises from 20 to 45 wt % of cyanate ester, from 0.1 to 2 wt % of catalyst, from 1 to 60 wt % of filler and from 10 to 70 wt % of fibres, based on the total weight of the bulk moulding compound.

Preparation of BMC

The invention also provides a method for the preparation of a bulk moulding compound as defined above.

The method for the preparation of a bulk moulding compound according to the invention comprises
  (i) providing a first mix by mixing said cyanate ester with said catalyst; and
  (ii) mixing said first mix with said filler and said fibres to provide the bulk moulding compound.

In one embodiment the mixing step (ii) is performed at a temperature of below 100° C., i.e., the temperature where the cyanate ester begins to polymerize, preferably at a temperature below 90° C. and even more preferably at a temperature below 60° C. In another embodiment the mixing step (ii) is performed at a temperature from 25 to 70° C., preferably from 25 to 60° C.; more preferably from 35 to 55° C., even more preferably from 35 to 55° C., especially from 40° C. to 50° C.

In one embodiment, providing a first mix according to step (i) further comprises mixing said cyanate ester with said catalyst together with further components selected from mould release agents, shrinkage modifiers, pigments and additives.

The mixing may be performed with any known types of mixers, such as stirrers or kneaders, preferably the kneader is selected from a Z-arm type kneader and a kneader with a sigma type blade or sigma type blades.

In one embodiment, the bulk moulding compound to be used in the invention may be prepared by mixing of its components with a stirrer.

In another embodiment the bulk moulding compound to be used in the invention may be prepared by mixing of its components with a kneader, preferably a Z-arm kneader.

In one embodiment the mixing step ii) of the first mix with the fillers and the fibres is done until the reinforcement fibres are well impregnated with the first mix (i.e., the resin system).

In one embodiment the mixing time in step ii) is from 8 min to 1 h, more preferably from 10 to 30 min.

The bulk moulding compound can be stored between the mixing of the bulk moulding components and moulding for at least six months at temperatures from about −18° C. to about 30° C.

The bulk moulding compound has preferably a viscosity of at least $5 \times 10^4$ and $1 \times 10^5$ Pa*s at room temperature, more preferably the bulk moulding compound has a dough-like solid form with a viscosity of $>1 \times 10^5$ Pa*s.

Preparation of Moulded Composite

The invention further provides a method for the preparation a moulded composite comprising the steps of
  (a) providing a bulk moulding compound of the invention;
  (b) pre-heating said bulk moulding compound;
  (c) transferring said bulk moulding compound into a mould;
  (d) curing said bulk moulding compound to obtain a moulded composite; and
  (e) optionally post-curing said moulded composite.

In one embodiment, the method for the preparation a moulded composite comprising the steps of
  (a1) providing a first mix by mixing said cyanate ester with said catalyst;

(a2) mixing said first mix with said filler and said fibres to provide the bulk moulding compound;

(b) pre-heating said bulk moulding compound;

(c) transferring said bulk moulding compound into a mould;

(d) curing said bulk moulding compound to obtain a moulded composite; and (e) optionally post-curing said moulded composite.

The pre-heating step (b), which is applied to the bulk moulding compound before the actual moulding is done to improve the handling of the bulk moulding compound.

The pre-heating step (b) is preferably done at a temperature above room temperature but below the temperature where cyanate ester begins to polymerize, preferably at a temperature of about 20° C. to 100° C., more preferably of about 20° C. to 90° C., and even more preferably of about 20° C. to 85° C.

The pre-heating step (b) is preferably done from 10 min to 1 h, more preferably from 15 to 45 min.

The method for preparation of the moulded composite as defined herein can be compression moulding process, or an injection moulding process.

Preferably the curing step (d) is done at a temperature from 120 to 220° C., more preferably from 150 to 200° C., more preferably at a temperature from 180° C. to 200° C.

The curing step (d) can be done from 1 min to 1 h, preferably from 5 to 30 min, more preferably from 5 to 20 min.

In one embodiment, the curing step (d) is done at a pressure of 50 kg/cm³ or more, more preferably of 75 kg/cm³ or more. Preferably, the curing step (d) is done at a pressure from 50 to 200 kg/cm³, more preferably from 75 to 150 kg/cm³.

The moulded composite is cured in form of parts of desired shape and size.

After the moulded composite part is demoulded, an additional heating step (e) may be performed, also referred to as "free-standing post-curing treatment". Free standing means that the additional curing is done separately, for example in an oven (or any other high temperature environment) after the part is removed from the mould. The additional heating step (e) allows that the part needs to be cured for only a short time in the mould, then the part can be taken out (demould) so that the mould is available to produce a new parts. In step (e), several parts can be heated ("post-cured") together. This may be done in an oven, or in a high temperature environment, i.e., "during service".

In one embodiment the post-curing step (e) is done at a temperature from 100 to 300° C., more preferably from 180 to 280° C., even more preferably from 240 to 260° C. Preferably, the time of the free-standing post-curing treatment is from 30 min to 16 h, more preferably from 30 to 3 h, even more preferably from 30 min to 2 h.

The compression moulding process can be done in any mould apparatus known to the skilled person in the art, such as a moulding press. The mould is closed to compress, spread and finally cure the bulk moulding compound.

In the injection moulding process, the bulk moulding compound is mechanically stuffed into the feed section of an injection moulding machine. The screw of the injection moulding machine pulls the bulk moulding compound into the preheated barrel and moves it forward as it turns about its own axis inside the barrel. The viscosity of bulk moulding compound is lowered by barrel heating as well as the shear heating created by intense mixing and plastication that take place inside the barrel. The bulk moulding compound BMC is injected into a closed mould cavity that is preheated to the desired curing temperature. The mould is closed to compress, spread and finally cure the bulk moulding compound with same parameter as mentioned above.

The moulded composite parts obtained by the method of the invention exhibit a high temperature resistance, as given by the glass transition temperature Tg (determined by Tan Delta measurement via DMTA) of preferably more than 130° C., more preferably 130 to 160° C., after demoulding and preferably more than 180° C., more preferably 220 to 380° C.

The moulded composite parts obtainable by the method of the invention may be used in visible or non-visible application, including, but not limited to, fibre reinforced panels, such as protective covers, door and flooring panels, doors, stiffeners, spoilers, diffusers, boxes, etc., complex geometries, such as moulded parts with ribs, parts with rotational symmetry parts such as pipes, cylinders, and tanks, in particular fuel tanks, oil and gas riser, exhaust pipes, etc., and massive or hollow profiles, such as stiffeners, spring leaves, carriers, etc., and sandwich-structured parts with or without core structure, such as blades, wings, etc., or carbon fibre-reinforced plastic moulds for the manufacture of high performance composite materials.

The invention also provides a use of a bulk moulding compound according to the invention for producing a moulded composite.

The invention will further be demonstrated by the following non-limiting examples. All percentages are weight-% (wt %), unless specified otherwise.

EXAMPLES

Abbreviations

| | |
|---|---|
| BMC | Bulk moulding compound |
| DMTA | Dynamical mechanical thermal analysis |
| LDPE | Low density polyethylene polymer |
| MSDA | Material Safety Data Sheet |
| PE | Polyethylene |
| PHRR | peak heat release rate |
| RT | Room temperature |
| Tg | Glass transition temperature |
| TGA | Thermal gravimetric analysis |

Materials

| | |
|---|---|
| HA 1682 | Low density polyethylene polymer (LDPE) from Axalta Polymer Powders Switzerland, Melt Flow Index 70 (190° C./2.16 kg), DSC peak 105° C. (Melting peak in ° C. measured by differential scanning calorimetry), Particle Size distribution 98 to 100% <75 microns |
| Lonzacure ® M-DEA | Compound M-DEA from Lonza Ltd, Switzerland, CAS 13680-35-8, 4,4'-Methylenebis(2,6-diethylaniline) |
| Lonzacure ® M-CDEA | Compound M-CDEA from Lonza Ltd, Switzerland, CAS 106246-33-7, 4,4'-Methylenebis(3-chloro-2,6-diethylaniline) |

| | -continued |
|---|---|
| Al(acac)₃ | aluminum(III)acetylacetonate, from Sigma-Aldrich No. 208248 ReagentPlus ®, 99%, CAS 13963-57-0 |
| Cu(acac)₂ | copper(II)acetylacetonate, from Sigma-Aldrich No. 514365 ≥99.9%, CAS 13395-16-9 |
| Phenol | Phenol from Sigma-Aldrich No. 969616, CAS 108-95-2 |
| DETDA | Diethylmethylbenzenediamine from Lonza Solutions AG, Switzerland, CAS 68479-98-1 (DETDA80 Lonzacure ®) |
| Cyanate ester III | Polyfunctional cyanate ester of formula III from Lonza Ltd, Switzerland, CAS 87397-54-4, also the following CAS-number are applicable: CAS 153191-90-3, CAS 268734-03-8 |
| Cyanate ester IV | Polyfunctional cyanate ester of formula IV of Lonza Ltd, Switzerland, CAS 87397-54-4, also the following CAS-number are applicable: CAS 153191-90-3, CAS 173452-35-2 |
| Omyacarb ®2-AV | CaCO₃ from Omya SpA, Milano, Italy, Specifications: 97.5 wt % CaCO₃, 2 wt % MgCO₃, 0.03 wt % Fe₂O₃, insoluble in HCl less than 0.3 wt % |
| Omyacarb ®2T-AV | CaCO₃ (coated) from Omya SpA, Milano, Italy, Specifications: 97.5 wt % CaCO₃, 2 wt % MgCO₃, 0.03 wt % Fe₂O₃, insoluble in HCl less than 0.3 wt % |
| Talc | Talkron Pure 40 from Mineralia Minerals Girona SA, Spain, Specifications: 59.6 wt % SiO₂, 33.5 wt % MgO, 0.04 wt % Al₂O₃, 0.24 wt % Fe₂O₃, 0.09 wt % CaO, 0.02 wt % NaO, insoluble in HCl 3.1 wt % |
| Glass fibres 979 | chopped glass fibres from Owens Cornings OCV Reinforcement LLC, Ohio, USA, Type of glass: EC 14 6 mm 979, Filament Diameter: 14 micrometer |
| Glass fibres 552B | chopped glass fibres from Jushi Group Co., Ltd., Zhejiang, China, Type of Glass: E6-CR, Filament Diameter: 13 micrometer |
| SACHTOLITH ® HD-S | zinc sulfide pigment of Huntsman P&A Germany GmbH, Duisburg, Germany, CAS 1314-98-3 |
| Chemlease ® MPP 712 EZ | Mould sealer from Chem-Trend GmbH, Maisach-Gernlinden, Germany; composition according to MSDS: 30 to 50 wt % o-xylene, 20 to 25 wt % hexamethyldisiloxane, 10 to 20 wt % hydrocarbons, isoalkanes (hexamethyldisiloxane), 3 to 10 wt % MeOH, 1 to 10 wt % hexamethyldisiloxane, 1 to 10 wt % 3-butoxypropan-2-ol, 0.1 to 0.25 wt % dibutyltin dilaurate (CAS 77-58-7) |
| Chemlease ® R&B EZ | External release agent, Chem-Trend GmbH, Norderstedt, Germany; composition according to MSDS: 50 to 70 wt % $C_{7-9}$-iso-alkanes (CAS 64741-66-8), 10 to 20 wt % $C_{9-12}$ iso-alkanes (CAS 90622-57-4), 5 to 10 wt % low boiling naphtha (CAS 64742-89-8), 1 to 2.5 wt % $C_{10-12}$ iso-alkanes with <2% aromatics (EC/List no.: 923-037-2), 1 to 2.5 wt % $C_{9-10}$, n-alkanes, isoalkanes, cyclics, <2% aromatics (EC/List no.: 927-241-2), 1 to 10 wt % $C_{9-C11}$ n-alkanes, isoalkanes, cyclics, <2% aromatics (CAS 64742-48-9, 1174522-20-3) |
| Chemlease ® IC25 | internal mould release agent and lubricant, liquid with yellow colour, flash point above 200° C., density ca. 0.95 g/cm³ at 20° C., Chem-Trend (GmbH), Maisach-Gernlinden, Germany |
| Chemlease ® 2726W | semi-permanent, water-based release agent, Poly(difluoromethylene), liquid, pH 8 to 10, boiling point 99.4° C., Chem-Trend GmbH, Norderstedt, Germany |
| Chemlease ® 2752W | semi-permanent, water-based release agent, liquid, pH 10, boiling point 100° C., Chem-Trend GmbH, Norderstedt, Germany |
| AM 20-D | ARGOlab Overhead Stirrer: company ARGO LAB, Carpi MO, Italy |

Experimental Procedure for BMC for Example 1 and 2

Cyanate ester (liquefied by warming to a temperature of 90 to 100° C. and subsequent cooling to room temperature) was placed into a vessel at room temperature and mixed with an internal mould release agent (Chemlease® IC25) with a stirrer (type AM 20-D) until complete homogenization. In example 2 a zinc sulfide pigment in form of SACHTOLITH® HD-S, was added additionally. To the mixture were added the catalyst in solid form and mixed until complete homogenization. To this mixture were then added a shrinkage modifier and a filler and mixed for 10 to 15 min with a bulk moulding compound Kneader Z-Arm mixer until complete homogenization. The consistency of the mixture was oily and viscous.

To the oily and viscous mixture the reinforcement material in form of glass fibres was added and mixed for 15 to 20 min in the bulk moulding compound kneader until the reinforcement fibres were well impregnated, providing a BMC, which was transferred into a plastic PE sack. The consistency of the BMC was in a dough-like solid form or like a modelling clay. The components and their amounts in wt % (% based on the total weight of the mixture) and in gram in the BMC are given in table 1 (wt %) and table 2 (g).

Experimental procedure for BMC for example 3, 4, 5, 6, 7, 8, 9, 10, 11 and 12 Cyanate ester (liquefied by warming to a temperature of 90 to 100° C. and subsequent cooling to room temperature) was placed into a vessel at room temperature (Example 3, 4, 5) or at 70 to 75° C. (Example 6, 7, 8, 9 and 10) and the catalyst was added in solid form at RT (Example 3, 4, 5) or at 45 to 50° C. (Example 6, 7, 8, 9 and 10) and mixed until complete homogenization with a stirrer (type AM 20-D).

To this mixture were then added a filler and mixed for 10 to 15 min with a bulk moulding compound Kneader Z-Arm mixer until complete homogenization. The consistency of the mixture was oily and viscous.

To the oily and viscous mixture the reinforcement material in form of glass fibres was added and mixed for 15 to 20 min in the BMC Kneader until the reinforcement fibres are well impregnated, providing a BMC, which was transferred into a plastic PE sack. The consistency of the BMC was in a dough-like solid form or like a modelling clay. The components and their amounts in wt % (% based on the total weight of the mixture) and in grams (g) in the BMC are given in table 1 (wt %) and table 2 (g).

Table 1a and 1b: the components and their amounts in the BMC in wt % based on the total weight of the mixture for example 1 to 12

TABLE 1a

Example 1 to 6

| | Example | | | | | |
|---|---|---|---|---|---|---|
| | 1 | 2 | 3 | 4 | 5 | 6 |
| Cyanate ester III | 25 | 25 | 25 | 25 | 25 | 25 |
| Cyanate ester IV | | | | | | |
| M-DEA | 1.25 | 1.25 | 1.25 | 1.25 | | |
| M-CDEA | | | | | 1.25 | |
| Al(acac)$_3$ | | | | | | 0.19 |
| SACHTOLITH ® HD-S | | | | | | |
| IC25 | 0.75 | 0.75 | | | | |
| HA 1682 | 2 | 2 | | | | |
| HD-S | | 3 | | | | |
| Omyacarb ® 2-AV | 56 | 38 | 58.75 | 43.75 | 43.75 | 44.81 |
| Omyacarb ® 2T-AV | | | | | | |
| Talc Talkron 40 | | | | | | |
| Glass fibres 979 | 15 | 30 | 15 | | | |
| Glass fibres 552B | | | | 30 | 30 | 30 |
| Total wt % | 100 | 100 | 100 | 100 | 100 | 100 |

TABLE 1b

Example 7 to 12

| | Example | | | | | |
|---|---|---|---|---|---|---|
| | 7 | 8 | 9 | 10 | 11 | 12 |
| Cyanate ester III | 12.5 | 12.5 | 17.5 | 15 | 12.5 | 17.5 |
| Cyanate ester IV | 12.5 | 12.5 | 17.5 | 15 | 12.5 | 17.5 |
| M-DEA | | | | | | |
| M-CDEA | | | | | | |
| Al(acac)$_3$ | 0.19 | 0.15 | 0.21 | 0.18 | 0.15 | 0.21 |
| SACHTOLITH ® HD-S | | | | | | |
| IC25 | | | | | | |
| HA 1682 | | | | | | |
| HD-S | | | | | | |
| Omyacarb ® 2-AV | 44.81 | | | | | |
| Omyacarb ® 2T-AV | | 44.85 | | 19.91 | 54.85 | |
| Talc Talkron 40 | | | 34.79 | 19.91 | | 44.79 |
| Glass fibres 979 | | | | | | |
| Glass fibres 552B | 30 | 30 | 30 | 30 | 20 | 20 |
| Total wt % | 100 | 100 | 100 | 100 | 100 | 100 |

Table 2a and 2b: the components and their amounts in the BMC in g for example 1 to 12

TABLE 2a

Example 1 to 6

| | Example | | | | | |
|---|---|---|---|---|---|---|
| | 1 | 2 | 3 | 4 | 5 | 6 |
| Cyanate ester III | 625 | 625 | 625 | 400 | 400 | 400 |
| Cyanate ester IV | | | | | | |
| M-DEA | 31.25 | 31.25 | 31.25 | 20 | | |
| M-CDEA | | | | | 20 | |
| Al(acac)$_3$ | | | | | | 3.0 |
| SACHTOLITH ® HD-S | | 75 | | | | |
| IC25 | 18.75 | 18.75 | | | | |
| HA 1682 | 50 | 50 | | | | |
| HD-S | | | | | | |
| Omyacarb ® 2-AV | 1400 | 950 | 1469 | 700 | 700 | 717 |
| Omyacarb ® 2T-AV | | | | | | |
| Talc Talkron 40 | | | | | | |
| Glass fibres 979 | 375 | 750 | 375 | | | |
| Glass fibres 552B | | | | 480 | 480 | 480 |
| Total amount in [g] | 2500 | 2500 | 2500 | 1600 | 1600 | 1600 |

TABLE 2b

Example 7 to 12

| | Example | | | | | |
|---|---|---|---|---|---|---|
| | 7 | 8 | 9 | 10 | 11 | 12 |
| Cyanate ester III | 200 | 200 | 280 | 240 | 200 | 280 |
| Cyanate ester IV | 200 | 200 | 280 | 240 | 200 | 280 |
| M-DEA | | | | | | |
| M-CDEA | | | | | | |
| Al(acac)$_3$ | 3.0 | 2.4 | 3.3 | 2.8 | 2.4 | 3.36 |
| SACHTOLITH ® HD-S | | | | | | |
| IC25 | | | | | | |
| HA 1682 | | | | | | |
| HD-S | | | | | | |
| Omyacarb ® 2-AV | 717 | | | | | |
| Omyacarb ® 2T-AV | | 718 | | 318.6 | 877.6 | |
| Talc Talkron 40 | | | 556.6 | 318.6 | | 716.64 |
| Glass fibres 979 | | | | | | |
| Glass fibres 552B | 480 | 480 | 480 | 480 | 320 | 320 |
| Total amount in [g] | 1600 | 1600 | 1600 | 1600 | 1600 | 1600 |

Experimental Procedure for Moulded Composite Parts for Examples 1, 2 and 3

The BMC was pre-heated to 80° C. and transferred into a mould to produce the moulded composite parts. A hydraulic press was used to produce the parts. The BMC was moulded with a chromed-steel plate on the top and a standard steel plate on the bottom. The mould was cleaned, and the surface rubbed with an external mould release agent Chemlease 2726W, which is applied three times on the top and bottom surface before moulding the parts. The parameters for the curing step to obtain the final moulded composite parts are given in table 3.

Experimental Procedure for Moulded Composite Parts for Examples 4, 5, 6, 7, 8, 9, 10, 11 and 12

The BMC was pre-heated to 80° C. and transferred into a mould to produce the moulded composite parts. A hydraulic press was used to produce the parts. The BMC was moulded with a standard stainless-steel plate on the top and on the bottom. The mould was cleaned, and the surface was prepared by wiping onto the surface a primer Chemlease MPP 712 EZ and after that a liquid external mould release agent Chemlease R&B EZ was applied by spraying it onto the top and bottom surfaces for three times at interval of 10 min before moulding the parts. Then the Chemlease R&B EZ is re-applied after each moulding cycle by spraying it only one time. The parameters for the curing step to obtain the final moulded composite parts are given in table 3.

TABLE 3

Parameters for curing step for moulded composite parts for example 1 to 12

| Example | Dimension moulded composite mm$^2$ | Amount of BMC [g] | curing pressure [kg/cm$^2$] | Curing temperature [° C.] | curing time [min] | Internal mould release agent | External mould release agent |
|---|---|---|---|---|---|---|---|
| 1 to 3 | 300 × 300 | 600 | 90 to 100 | 170 to 190 | 12 | x | |
| 4 to 12 | 200 × 200 | 350 | 75 to 130 | 165 to 185 | 10 | | x |

Experimental Procedure for Post-Curing Treatment for Examples 1 to 12

After the moulded composite part is demoulded, a free-standing post-curing treatment was applied in an oven at a temperature between 240° C. and 260° C. in order to reach a high temperature resistance.

Samples from the moulded composite were cut to specimens and analyzed. The results are given in table 4.

The flexural mechanical properties are measured according the International Organization for Standards ISO 179 (flexural strength and modulus). The temperature resistance as expressed glass transition temperature $T_g$ by Tan Delta was measured by DMTA (dynamical mechanical thermal analysis). The decomposition temperature was measured by TGA (thermal gravimetric analysis). The flammability properties of peak heat release rate (PHRR), total heat release (THR) and char yield (given in %) were measured by FAA Microcalorimeter according to ASTM D 7309-07.

Glass transition temperature is the temperature, at which the physical properties of a polymeric materials change from amorphous rigid, glassy or crystalline state to a flexible rubbery state. The glass transition temperature $T_g$ is measured by dynamical mechanical thermal analysis (DMTA) and given as the Tan Delta Peak.

The thermal decomposition or thermal degradation temperature $T_d$ is measured by thermogravimetric analysis (TGA). The thermal degradation of a polymer is polymer deterioration as a result of overheating. By TGA the temperature $T_d$ is measured where the polymer samples degrades due to the production of CO, water vapour and $CO_2$.

TABLE 4

Analytic results for moulded composite parts for example 1 to 12

| example | Flexural modulus [MPA] | Flexural strength [MPA] | $T_g$ [° C.] | $T_d$ [° C.] | PHRR [W/g] | THR [KJ/g] | Char yield % |
|---|---|---|---|---|---|---|---|
| 1 | 12300 | 67 | ca. 260 | 408 | 80.5 | 5.5 | 55.7 |
| 2 | 12900 | 73 | ca. 260 | n.a. | n.a. | n.a. | n.a. |
| 3 | 16550 | 96 | 277 | 412 | 74.0 | 5.1 | 59 |
| 4 | 17360 | 141 | ca. 285 | 414 | 78.0 | 5.1 | 63.9 |
| 5 | 18500 | 145 | ca. 260 | n.a. | n.a. | n.a. | n.a. |
| 6 | 18000 | 108 | ca. 250 | n.a. | n.a. | n.a. | n.a. |
| 7 | 20500 | 189 | n.a. | n.a. | n.a. | n.a. | n.a. |
| 8 | 21300 | 153 | n.a. | n.a. | n.a. | n.a. | n.a. |
| 9 | 12610 | 84 | n.a. | n.a. | n.a. | n.a. | n.a. |
| 10 | 14100 | 99 | n.a. | n.a. | n.a. | n.a. | n.a. |
| 11 | 19800 | 166 | ca. 275 | 400-405 | n.a. | n.a. | n.a. |
| 12 | 12200 | 86 | ca. 285 | 415-420 | n.a. | n.a. | n.a. |

Comparative Example with DETDA as Catalyst 375 g cyanate ester IV (compound of formula IV) (liquefied by warming to a temperature of 90 to 100° C. and subsequent cooling to room temperature) was placed into a vessel at room temperature and the catalyst (6.0 g DETDA) was added in solid form at RT and mixed until complete homogenization with a stirrer (type AM 20-D).

To the mixture were then added 900.0 g of filler $CaCO_3$ in form of Omyacarb® 2-AV and mixed for 10 to 15 min with a BMC Kneader Z-Arm mixer until complete homogenization. The consistency of the mixture was oily and viscous.

225.0 g of reinforcement glass fibres 979 were then added to mixture and mixed for 15 to 20 min in the BMC Kneader until the fibres were well impregnated, providing a BMC, which was transferred into a plastic PE sack. The consistency of the BMC was in a dough-like solid form or like a modelling clay.

The bulk moulding compound obtained by this procedure with DETDA as catalyst had a storage stability of 1 to 2 days. The final part could be processed by compression moulding after 1-2 days of the production of the bulk moulding compound, but not anymore after storage at room temperature for 3 days. Therefore the bulk moulding compound could not further be process by compression moulding as it become hard and partially polymerized during storage condition.

Comparative Example with Copper(II)Acetylacetonate with and without Liquid Promoter The miscibility and reactivity of aluminium(II)acetylacetonate and copper(II)acetylacetonate as catalysts with polyfunctional cyanate ester of formula II was evaluated. In addition, a phenol as liquid promoter (co-catalyst) was added to mix with the powdered catalyst in order to evaluate the miscibility and reactivity. The role of the liquid promotor is to solubilize the catalyst in the cyanate ester. Since nonylphenol is known as toxic to health and environment an alternative liquid promoter has been used. Nonylphenol can be replaced by phenol, such the comparative experiments have been carried out with phenol as liquid promotor To compare different catalysts-system the gel time of the resin system was used as reference. The gel time depends is influenced by the temperature. With higher temperature the gel time decreases.

Gel time is the time it takes for a mixed resin system to gel or become so highly viscous that it can no longer be considered workable or able to be handled. The gel time was measured using a GELNORM® Geltimer GT-S (Gel Instrumente AG, Oberuzwil, Switzerland) according to DIN 16945.

Comparative Example Al(acac)$_3$ and Cu(acac)$_2$ without Liquid Promoter

Cyanate esters III and IV were liquefied by warming to a temperature of 90 to 100° C. Then a mixture of cyanate ester III and IV (1:1 by weigh %) was prepared by mixing the two cyanate esters at 80° C. for 10-15 min until complete homogenization with a magnetic stirrer (type stirring block heaters Drybath).

The catalysts was added direct in solid form to the cyanate ester mixture at 50° C. and mixed 3-5 min until complete homogenization with a magnetic stirrer (type stirring block heaters Drybath). The reactivity was measured by mean of gel time (GELNORM® Geltimer GT-S) at 80° C. and 100° C. The results are shown in Table 5 below.

TABLE 5 curing reaction of cyanate ester III and IV with Al(acac)$_3$ and Cu(acac)$_2$

| catalyst | catalyst in wt % | Geltime in min | |
|---|---|---|---|
| | | T = 80°C | T = 100° C. |
| Al(acac)$_3$ | 0.50 | 1268 | 207 |
| Cu(acac)$_2$ | 0.50 | 332 | 56 |

Comparative Example Al(acac)$_3$ and Cu(acac)$_2$ with Liquid Promoter

Cyanate esters III and IV were liquefied by warming to a temperature of 90 to 100° C. Then a mixture of cyanate ester III and IV (1:1 by weigh %) was prepared by mixing the two cyanate ester at 80° C. for 10-15 min until complete homogenization with a magnetic stirrer (type stirring block heaters Drybath).

The phenol is liquefied at 50° C. and then the catalyst was mixed with it for 3-5 min at 50° C. Then this catalyst-phenol is added to the cyanate ester mixture at 50° C. and mixed 3-5 min until complete homogenization with a magnetic stirrer (type stirring block heaters Drybath). The reactivity was measured by mean of gel time (GELNORM® Geltimer GT-S) at 80° C. and 100° C. Two different ratio of phenol were considered and tested. The results are shown in Table 6 below.

TABLE 6

Curing reaction of cyanate ester III and IV in the presence of Al(acac)$_3$ and Cu(acac)$_2$ and liquid promoter

| catalyst | catalyst in wt % | phenol in wt % | Geltime in min | |
|---|---|---|---|---|
| | | | T = 80° C. | T = 100° C. |
| Al(acac)$_3$ | 0.50 | 0.17 | 929 | 195 |
| Al(acac)$_3$ | 0.50 | 2.56 | 255 | 31 |
| Cu(acac)$_2$ | 0.50 | 0.17 | 297 | 51 |
| Cu(acac)$_2$ | 0.50 | 2.56 | 58 | n.a. too reactive |

The copper(II)acetylacetonate catalyst was difficult to mix and homogenize with the cyanate esters and formed a heterogeneous mixture. Further it separated from the cyanate ester by falling to the bottom of the reaction vessel. The aluminium(III)acetylacetonate catalyst remained in the cyanate ester.

In the presence of phenol as liquid promotor the copper (II)acetylacetonate still remained difficult to mix and homogenize with the cyanate esters compared to the aluminium(III) acetylacetonate catalyst. Further we have observed that the cured cyanate esters developed a very dark blueish colour by use of copper(II)acetylacetonate, whereas with aluminium(III)acetylacetonate as catalyst the colour of the cured cyanate ester remained similar to the uncured starting material.

It could be unexpectedly found that the reactivity (measured as gel time) of the cyanate esters in the presence of copper(II)acetylacetonate as catalyst is more than three times faster compared to the use of aluminium(III)acetylacetonate as catalyst, with and without presence of a liquid promoter.

The invention claimed is:
1. A bulk moulding compound comprising one or more cyanate ester, a catalyst, a filler and reinforcement fibres, wherein the one or more cyanate ester is independently selected from
a) a difunctional cyanate ester compound of formula (I)

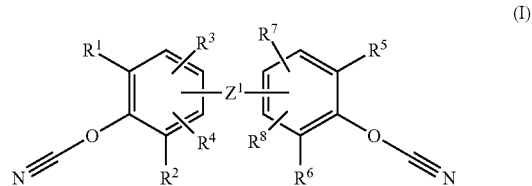

wherein
R$^1$ through R$^8$ are independently selected from the group consisting of hydrogen, linear C$_{1-10}$ alkyl, halogenated linear C$_{1-10}$ alkyl, branched C$_{4-10}$ alkyl, halogenated branched C$_{4-10}$ alkyl, C$_{3-8}$ cycloalkyl, halogenated C$_{3-8}$ cycloalkyl, C$_{1-10}$ alkoxy, halogen, phenyl and phenoxy;
Z$^1$ indicates a direct bond or a divalent moiety selected from the group consisting of —O—, —S—, —S(=O)—, —S(=O)$_2$—, —CH$_2$—, —CH(CH$_3$)—, —C(CH$_3$)$_2$—, —CH(CF$_3$)—, —C(CF$_3$)$_2$—, —C(=O)—, —C(=CH$_2$)—, —C(=CCl$_2$)—, —Si(CH$_3$)$_2$—, linear C$_{1-10}$ alkanediyl, branched C$_{4-10}$ alkanediyl, C$_{3-8}$ cycloalkanediyl, 1,2-phenylene, 1,3-phenylene, 1,4-phenylene, —N(R$^{13}$)— wherein R$^{13}$ is selected from the group consisting of hydrogen, linear C$_{1-10}$ alkyl, halogenated linear C$_{1-10}$ alkyl, branched $C_{4-10}$ alkyl, halogenated branched $C_{4-10}$ alkyl, $C_{3-8}$ cycloalkyl, phenyl and phenoxy, and moieties of formulas

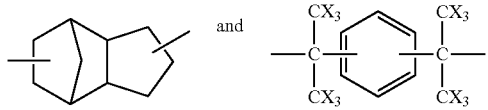

wherein X is independently selected from hydrogen and halogen;
and oligomers, polymers or mixtures thereof; and/or
b) a polyfunctional cyanate ester of formula (II)

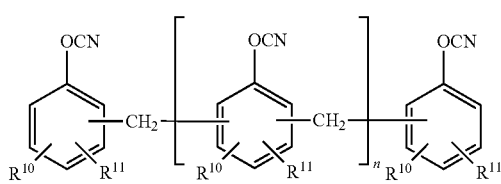 (II)

wherein
n is an integer from 1 to 20; and
$R^{10}$ and $R^{11}$ are identical or different and independently from each other selected from the group consisting of hydrogen, linear $C_{1-10}$ alkyl and branched $C_{4-10}$ alkyl; and oligomers, polymers or mixtures thereof,
and mixtures of cyanate esters of formula (I) and (II); and
wherein the catalyst is aluminum(III)acetylacetonate.

2. The bulk moulding compound according to claim 1, wherein
(a) the difunctional cyanate ester of formula I is independently selected from the group consisting of
  i) $R^1$, $R^2$, $R^5$ and $R^6$ are methyl, $R^3$, $R^4$, $R^7$ and $R^8$ are hydrogen and wherein $Z^1$ is methylene; and oligomers, polymers or mixtures thereof, or
  ii) $R^1$ through $R^8$ are hydrogen and $Z^1$ is —$C(CH_3)_2$— (Primaset® BADCy); and oligomers, polymers or mixtures thereof, or
  iii) $R^1$ through $R^8$ are hydrogen and $Z^1$ is —S—; and oligomers, polymers or mixtures thereof, or
  iv) $R^1$ through $R^8$ are hydrogen and $Z^1$ is —$C(CF_3)_2$—; and oligomers, polymers or mixtures thereof, or
  v) $R^1$ through $R^8$ are hydrogen and $Z^1$ is —$C(=CCl_2)$—; and oligomers, polymers or mixtures thereof, or
  vi) $R^1$ through $R^8$ are hydrogen and $Z^1$ is

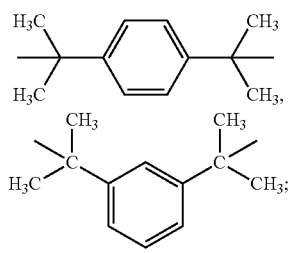

and oligomers, polymers or mixtures thereof, or vii) $R^1$ through $R^8$ are hydrogen and $Z^1$ is

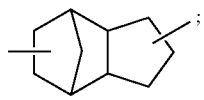

and oligomers, polymers or mixtures thereof,
and oligomers, polymers or mixtures thereof;
and/or
(b) the polyfunctional cyanate ester of formula II is independently selected from the group consisting of compounds wherein n is an integer from 1 to 6; and
$R^{10}$ and $R^{11}$ are identical or different and independently selected from the group consisting of hydrogen, methyl, ethyl, propyl and butyl;
and oligomers, polymers or mixtures thereof;
and mixtures of cyanate esters of formula (I) and (II).

3. The bulk moulding compound according to claim 1, wherein
(a) the difunctional cyanate ester of formula I is independently selected from the group consisting of compounds wherein
  i) $R^1$, $R^2$, $R^5$ and $R^6$ are methyl, $R^3$, $R^4$, $R^7$ and $R^8$ are hydrogen and wherein $Z^1$ is methylene; and oligomers, polymers or mixtures thereof, or
  ii) $R^1$ through $R^8$ are hydrogen and $Z^1$ is —$C(CH_3)_2$— (Primaset® BADCy); and oligomers, polymers or mixtures thereof, or
  iii) $R^1$ through $R^8$ are hydrogen and $Z^1$ is independently selected from the group consisting of

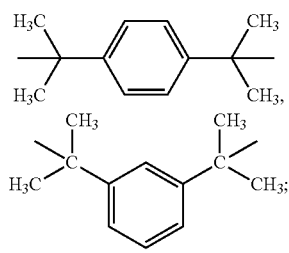

and oligomers, polymers or mixtures thereof, or
  iv) $R^1$ through $R^8$ are hydrogen and $Z^1$ is

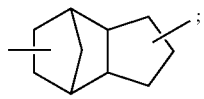

and oligomers, polymers or mixtures thereof;
and oligomers, polymers or mixtures thereof
and/or
(b) the polyfunctional cyanate ester is independently selected from the group consisting of compound of formula III, compound of formula IV, compound of formula V and compound of formula VI:

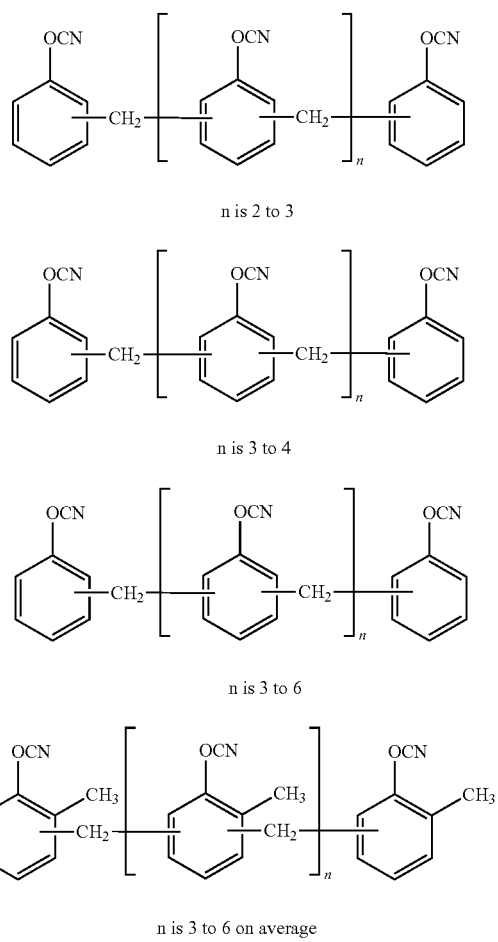

III n is 2 to 3

IV n is 3 to 4

V n is 3 to 6

VI n is 3 to 6 on average and mixtures of cyanate esters of formula (I) and (II).

4. The bulk moulding compound according to claim 1, wherein the reinforcement fibres are selected from carbon fibres, glass fibres, aramid fibres, basalt fibres, natural fibres, fleeces, woven fabrics, and mixtures thereof.

5. The bulk moulding compound according to a claim 1, wherein the reinforcement fibres are selected from chopped strand glass fibres, chopped strand carbon fibres, and mixtures thereof.

6. The bulk moulding compound according to claim 1, wherein the filler is independently selected from the group consisting of $CaCO_3$, coated $CaCO_3$, kaolin clay, $SiO_2$, talc, graphite, corundum ($\alpha$-$Al_2O_3$), SiC, glass microspheres, mica, calcium silicate ($Ca_2O_4Si$), wollastonite, MgO, anhydrous calcium sulfate ($CaSO_4$ or anhydrite), ceramic hollow microspheres, fused mullite ($Al_2O_3$—$SiO_2$), boron nitride (BN), vermiculite, basalt, and mixtures thereof.

7. A method for the preparation of a bulk moulding compound according to claim 1, comprising the steps of
 (i) providing a first mix by mixing the cyanate ester with the catalyst, and
 (ii) mixing the first mix with the reinforcement fibres and the filler.

8. The method according to claim 7, wherein
 step (i) further comprises mixing the cyanate ester with the catalyst together with one or more further components selected from mould release agents, shrinkage modifiers, pigments and additives; and/or
 the mixing step (ii) is performed at a temperature of below 100° C.

9. A method for the preparation of a moulded composite comprising the steps of:
 (i) providing a bulk moulding compound as defined in claim 1;
 (ii) pre-heating the bulk moulding compound;
 (iii) transferring the bulk moulding compound into a mould;
 (iv) curing the bulk moulding compound to obtain a moulded composite; and
 (v) optionally heating the moulded composite.

10. The method according to claim 9, wherein
 step (i) comprises (i1) providing a first mixture by mixing the cyanate ester with the catalyst; and (i2) mixing the first mixture with the filler and the fibres to provide the bulk moulding compound; and/or
 step (ii) is done at a temperature above room temperature but below the temperature where cyanate ester begins to polymerize; and/or
 step (iv) is done at a temperature from 120 to 220° C.; and/or
 step (iv) is done at a pressure of 50 kg/cm$^3$ or more; and/or
 step (v) is done at a temperature from 100 to 300° C.

11. The method according to claim 9, wherein the method for the preparation of the moulded composite is a compression moulding process or injection moulding process.

12. A moulded composite obtained by a process according to claim 9.

13. The moulded composite according to claim 12, the moulded composite having a glass transition temperature Tg (determined by Tan Delta measurement via DMTA) of more than 130° C.

14. Use of a bulk moulding compound as defined in claim 1, for producing a moulded composite.

* * * * *